US006204997B1

United States Patent
Sasaki

(10) Patent No.: US 6,204,997 B1
(45) Date of Patent: Mar. 20, 2001

(54) THIN FILM MAGNETIC HEAD WITH A PLURALITY OF ENGAGED THIN-FILM COILS AND METHOD OF MANUFACTURING THE SAME

(75) Inventor: Yoshitaka Sasaki, Yokohama (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/149,135

(22) Filed: Sep. 8, 1998

(30) Foreign Application Priority Data

May 19, 1998 (JP) .................................................. 10-136928
May 29, 1998 (JP) .................................................. 10-149897

(51) Int. Cl.[7] ................................ G11B 5/17; G11B 5/31
(52) U.S. Cl. ............................................ 360/123; 360/126
(58) Field of Search ...................................... 360/123, 126

(56) References Cited

U.S. PATENT DOCUMENTS

| | | | |
|---|---|---|---|
| 4,416,056 | 11/1983 | Takahashi | 29/603 |
| 4,639,811 | * 1/1987 | Diepers et al. | 360/125 |
| 4,684,438 | * 8/1987 | Lazzari | 216/22 |
| 4,860,140 | * 8/1989 | Momata et al. | 360/127 |
| 5,065,270 | 11/1991 | Koyanagi et al. | 360/123 |
| 5,113,300 | * 5/1992 | Ikeda et al. | 360/126 |
| 5,448,822 | * 9/1995 | Wu et al. | 29/603.24 |
| 5,452,168 | * 9/1995 | Nepela et al. | 360/126 |
| 5,608,964 | * 3/1997 | Shimizu | 29/603.14 |
| 5,706,152 | * 1/1998 | Honjo et al. | 360/123 |
| 5,856,898 | * 1/1999 | Ohashi | 360/123 |

FOREIGN PATENT DOCUMENTS

| | | |
|---|---|---|
| B2-55-41012 | 10/1980 | (JP) . |
| 63-204504 | 8/1988 | (JP) . |
| 2-14417 | 1/1990 | (JP) . |
| 2-27508 | 1/1990 | (JP) . |
| 2-302920 | 12/1990 | (JP) . |
| 5-182135 | 7/1993 | (JP) . |
| 5-242430 | 9/1993 | (JP) . |

* cited by examiner

*Primary Examiner*—Brian E. Miller
(74) *Attorney, Agent, or Firm*—Oliff & Berridge, PLC

(57) ABSTRACT

A thin-film magnetic head having at least an induction magnetic transducer for writing is provided for improving the head characteristics by reducing the magnetic path length with a reduction in the coil bundle width and for suppressing generation of voids during a manufacturing process. An insulating layer is formed on the surface of helical projections and depressions formed by a first coil. A second coil is embedded in a helical groove of the first coil covered with the insulating layer. The pitch of turns of the thin-film coil of a single layer is reduced without particularly improving processing accuracy of the step of fabricating the first coil. Insulator sidewalls are formed to cover a seed layer on sides of the helical groove only. The insulator sidewalls prevent plating growth from the seed layer on the sides of the helical groove. The second coil reaches not only the recess of the helical groove made up of the first coil and the insulating layer but also part of top of the helical plateau-shaped projection. The second coil has a T-shaped cross section. As a result, the cross-sectional area of the second coil is increased and the electrical resistance of the thin-film coil is reduced.

53 Claims, 39 Drawing Sheets

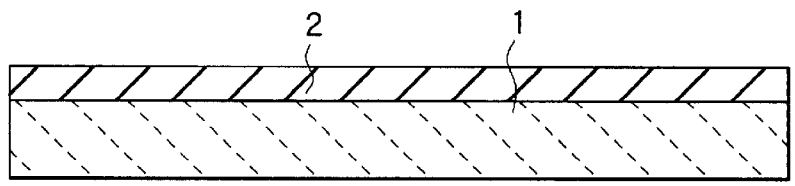 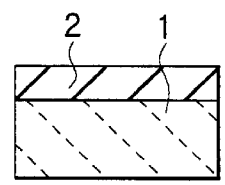
FIG.9A  FIG.9B
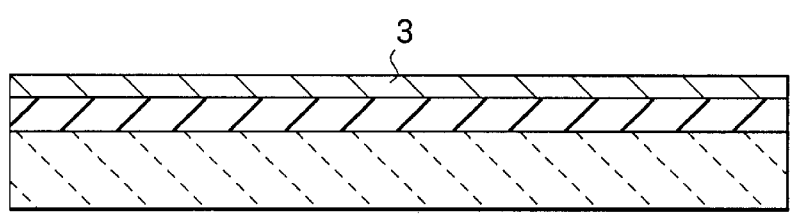 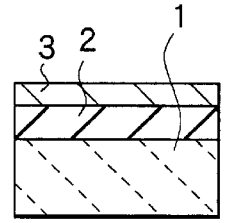
FIG.10A  FIG.10B
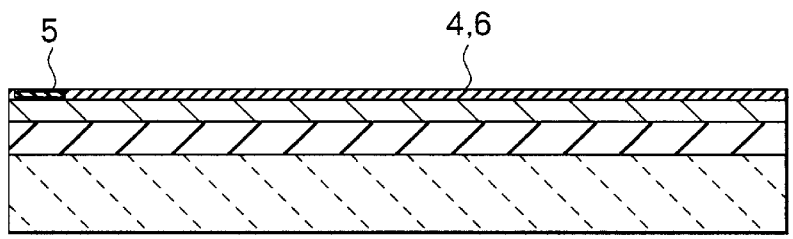 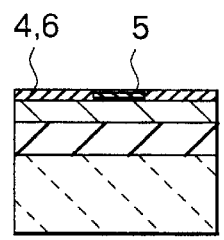
FIG.11A  FIG.11B
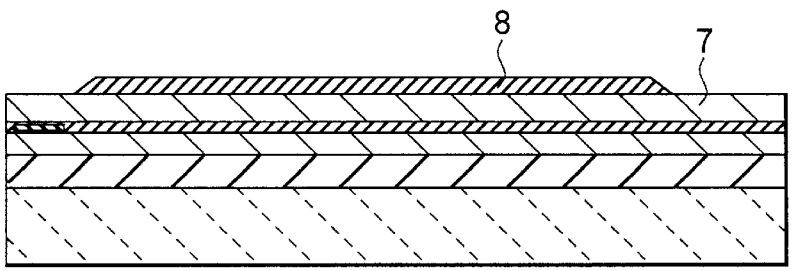 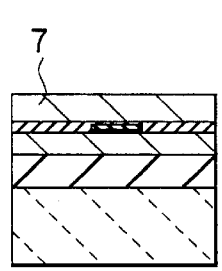
FIG.12A  FIG.12B
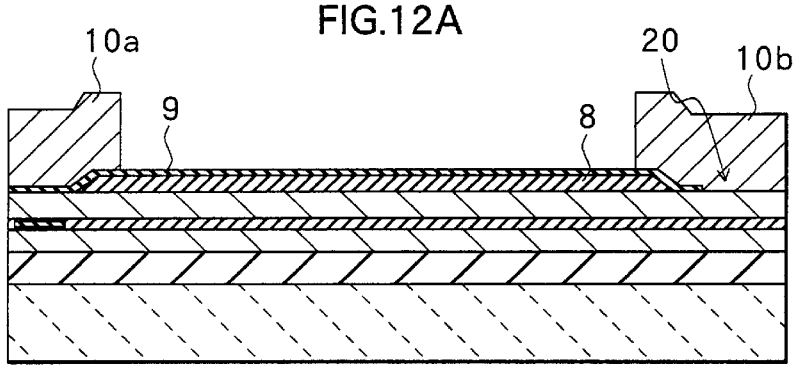 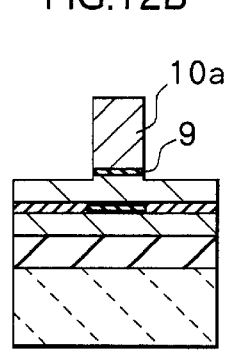
FIG.13A  FIG.13B

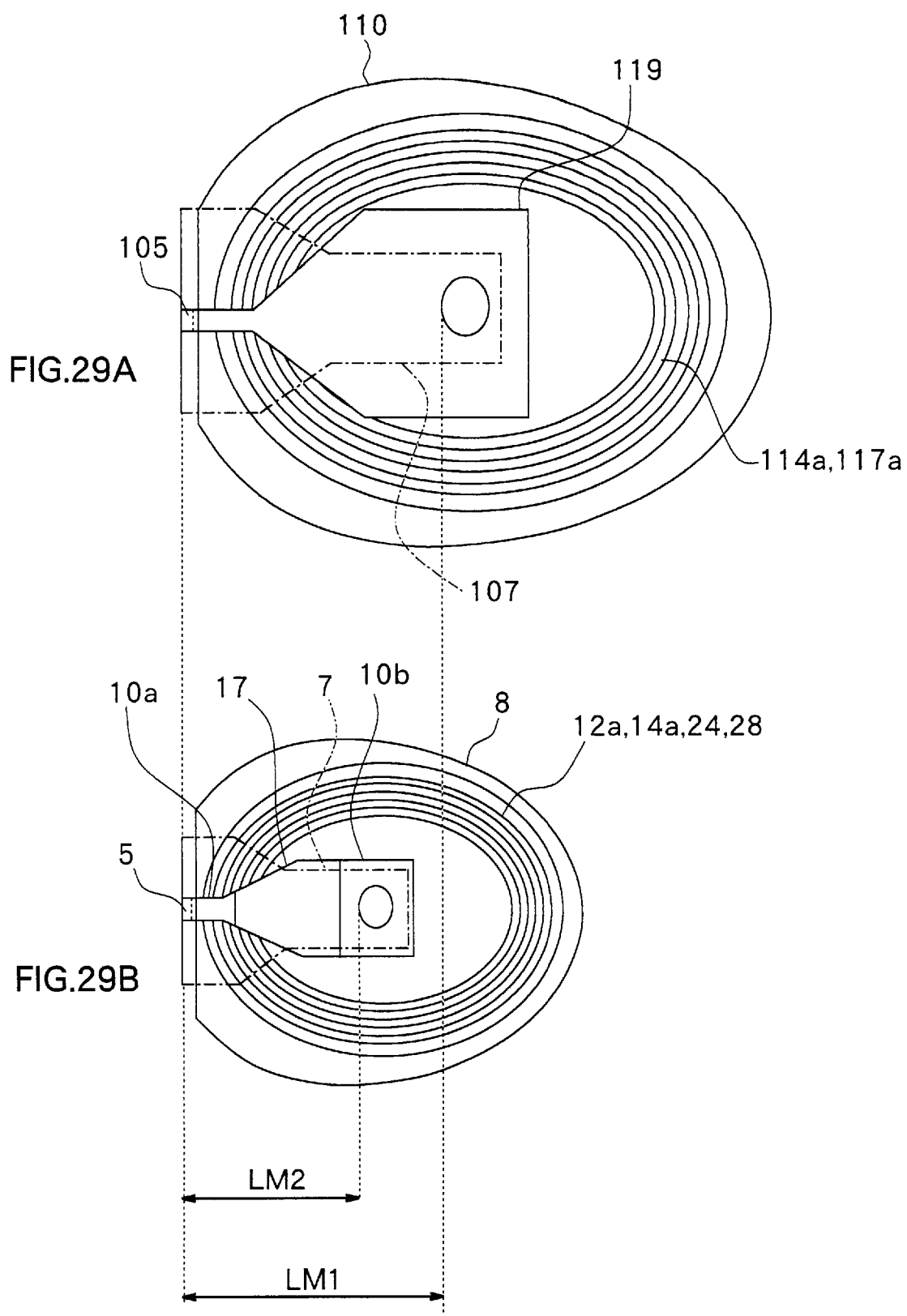

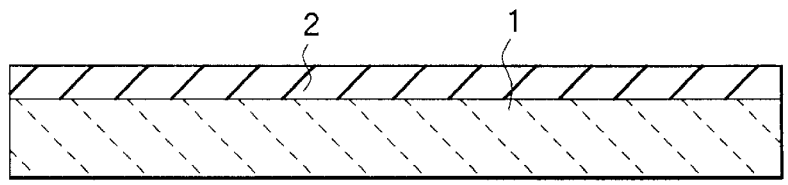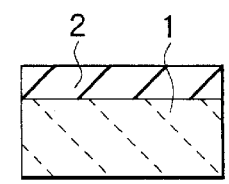
FIG.32A  FIG.32B
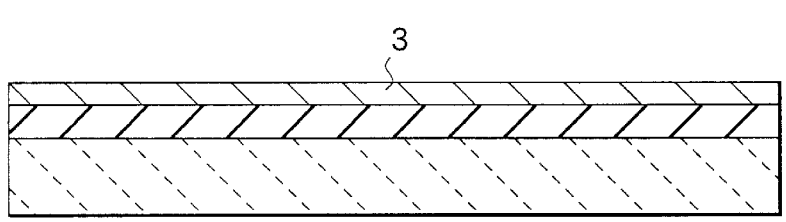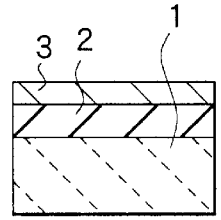
FIG.33A  FIG.33B
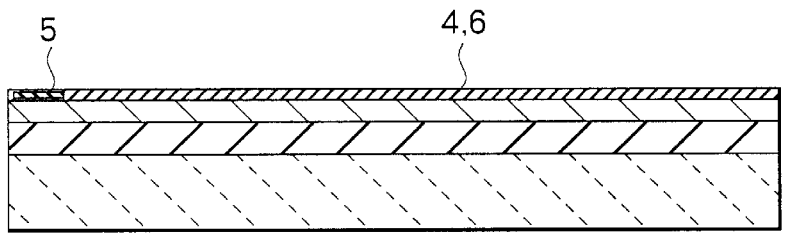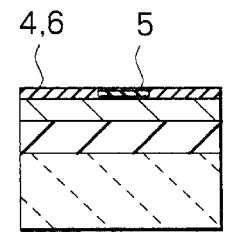
FIG.34A  FIG.34B
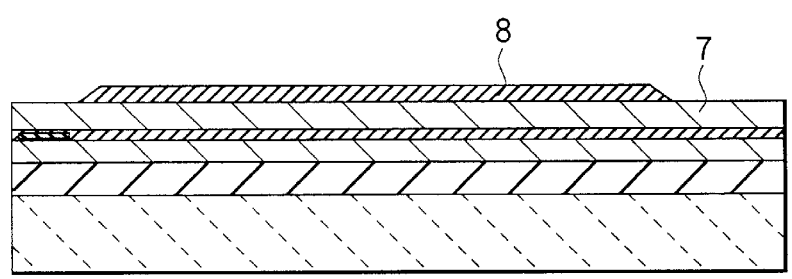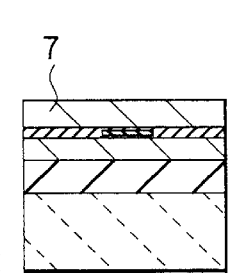
FIG.35A  FIG.35B
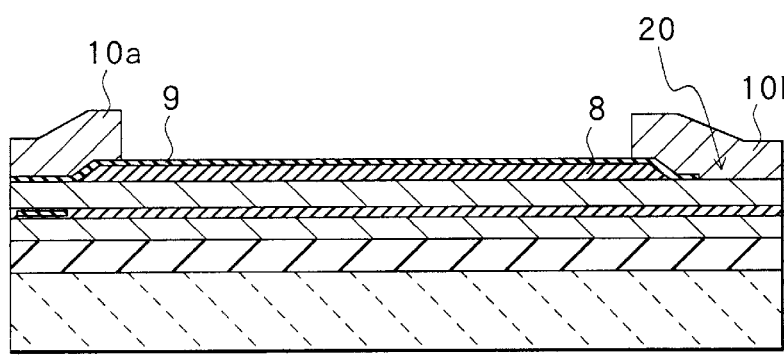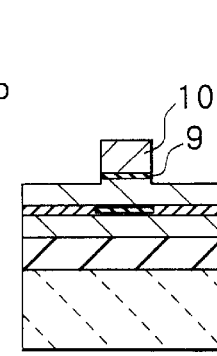
FIG.36A  FIG.36B

THIN FILM MAGNETIC HEAD WITH A PLURALITY OF ENGAGED THIN-FILM COILS AND METHOD OF MANUFACTURING THE SAME

BACKGROUND OF THE INVENTION

1. Field of the Invention

The present invention relates to a thin-film magnetic head having at least an induction magnetic transducer for writing and a method of manufacturing the thin-film magnetic head.

2. Description of the Related Art

Performance improvements in thin-film magnetic heads have been sought with an increase in surface recording density of a hard disk drive. A composite thin-film magnetic head has been widely used which is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called and AMR head or simply MR head. A reproducing head using a GMR element is called an GMR head. An AMR head is used as a reproducing head whose surface recording density is more than 1 gigabit per square inch. A GMR head is used as a reproducing head whose surface recording density is more than 3 gigabit per square inch.

An AMR head includes an AMR film having the AMR effect. In a GMR head the AMR film is replaced with a GMR film having the GMR effect and the configuration of the GMR head is similar to that of the AMR head. However, the GMR film exhibits a greater change in resistance under a specific external magnetic field compared to the AMR film. As a result, the reproducing output of the GMR head is about three to five times as great as that of the AMR head.

An MR film may be changed in order to improve the performance of a reproducing head. In general, an AMR film is made of a magnetic substance that exhibits the MR effect and has a single-layer structure. In contrast, many of the GMR films have a multilayer structure consisting of a plurality of films. There are several types of mechanisms of producing the GMR effect. The layer structure of a GMR film depends on the mechanism. GMR films include a superlattice GMR film, a granular film, a spin valve film and so on. The spin valve film is the most efficient since the film has a relatively simple structure, exhibits a great change in resistance in a low magnetic field, and is suitable for mass production. The performance of a reproducing head is thus easily improved by replacing an AMR film with a GMR film and the like with an excellent magnetoresistive sensitivity.

Besides selection of a material as described above, the pattern width such as the MR height, in particular, determines the performance of a reproducing head. The MR height is the length (height) between the end of an MR element closer to the air bearing surface and the other end. The MR height is controlled by an amount of lapping when the air bearing surface is processed. The air bearing surface is the surface of a thin-film magnetic head that faces a magnetic recording medium and may be called track surface as well.

Performance improvements in a recording head have been expected, too, with performance improvements in a reproducing head. It is required to increase the track density of a magnetic recording medium in order to increase the recording density among the performances of a recording head. In order to achieve this, a recording head of a narrow track structure is required to be implemented, wherein the width on the air bearing surface between a bottom pole and a top pole sandwiching a write gap is reduced to the order of some microns to submicron. Semiconductor process techniques are employed to achieve the narrow track structure.

Another factor determining the recording head performance is the throat height (TH). The throat height is the length (height) of the pole portion between the air bearing surface and the edge of the insulating layer electrically isolating the thin-film coil for generating magnetic flux. A reduction in throat height is desired in order to improve the recording head performance. The throat height is controlled as well by an amount of lapping when the air bearing surface is processed.

Furthermore, a reduction in length of the portion of the bottom and top poles sandwiching the thin-film coil (called magnetic path length in the following description) is proposed in order to improve the recording head performance.

As thus described, it is important to fabricate a recording head and reproducing head appropriately balanced so as to improve performances of a thin-film magnetic head.

Referring to the accompanying drawings, the configuration of the thin-film coil that determines the magnetic path length and a method of fabricating the coil will now be described.

FIG. 1 to FIG. 8 illustrate main parts of a method of manufacturing a composite thin-film magnetic head having an MR element as an example of a typical thin-film magnetic head of related art. FIG. 1 to FIG. 8 are cross sections of the main parts of intermediate products taken along the plane orthogonal to the air bearing surface. The example shown is a composite thin-film magnetic head made of an induction-type thin-film magnetic head for recording stacked on a magnetoresistive effect type composite thin-film magnetic head for reproduction.

As shown in FIG. 1, an insulating layer 102 made of alumina ($Al_2O_3$), for example, of about 5 to 10 μm in thickness is deposited on a substrate 101 made of aluminum oxide and titanium carbide ($Al_2O_3$—TiC), for example. On the insulating layer 102 a bottom shield layer 103 of 3 to 4 μm in thickness is formed which makes up a magnetic shield layer for protecting an MR element (an MR film 105 described below) of a reproducing head from an external magnetic field. Next, on the bottom shield layer 103 alumina of 100 to 200 nm in thickness, for example, is deposited through sputtering to form a shield gap film 104. On the shield gap film 104 the MR film 105 of tens of nanometers in thickness for making up the MR element of the reproducing head is formed and a desired shape is obtained through high-precision photolithography. Next, a shield gap film 106 is formed on the shield gap film 104 and the MR film 105 is buried in the shield gap films 104 and 106. Next, on the shield gap film 106 a magnetic layer 107 of Permalloy (NiFe) of 3 to 4 μm in thickness is formed. The magnetic layer 107 not only functions as a top shield layer for magnetically shielding the GMR element of the reproducing head together with the bottom shield layer 103 described above but also functions as a bottom pole of the recording head. For convenience of description, the magnetic layer 107 is simply called bottom pole 107 in the following description, attention being focused on the fact that the magnetic layer 107 is one of the magnetic layers forming the recording head.

Next, as shown in FIG. 2, on the bottom pole 107, a recording gap layer 109 made of a nonmagnetic material such as alumina having a thickness of about 200 nm is formed. A photoresist 110 for determining the reference position of the throat height is formed on the recording gap layer 109 except the part to make up the pole. A thin seed layer 111 made of copper (Cu), for example, of the order of 100 nm in thickness is formed through sputtering over the whole surface. The seed layer 111 is to be a seed of forming a thin-film coil by electroplating. Next, a thick photoresist 112 of 3 to 4 µm in thickness is formed on the seed layer 111. A helical opening 113 that reaches the seed layer 111 is formed in the photoresist 112 by photolithography. The depth of the opening 113 is equal to the thickness of the photoresist 112 and the width is about 2 µm. The width of the helical photoresist pattern formed by the opening 113 is about 2 µm as well.

Next, as shown in FIG. 3, copper electroplating is performed with copper sulfate to form a coil element 114 making up a first layer of the thin-film coil in the opening 113 of the photoresist 112. The thickness of the coil element 114 is preferably thinner than the depth of the opening 113 and may be 2 to 3 µm.

As shown in FIG. 4, the photoresist 112 is removed. As shown in FIG. 5, milling with argon ion beams IB (ion milling) is performed to remove the seed layer 111 and separate the turns of the coil element 114 from one another so as to form a coil 114a of the first layer. The ion milling is performed at an angle of 5 to 10 degrees with respect to the normal to the substrate in order to prevent the seed layer 111 at the bottom of the coil element 114 between the turns from projecting outward the thin-film coil and remaining. If ion milling is performed at an angle nearly orthogonal to the substrate in such a manner, the material of the seed layer 111 may scatter with the impact of ion beams and redeposit. As a result, complete separation of the turns of the coil element 114 may be made impossible. It is therefore required to allow relatively wide spacing among the turns of the coil element 114, which will be described later.

Next, as shown in FIG. 6, a photoresist 115 is formed to cover the coil 114a of the first layer and the photoresist 110. Heat treatment at a temperature of 250° C., for example, is performed to flatten the coil 114a and to determine the apex angle described below and so on. Next, as shown in FIG. 6, a coil 117a of a second layer including a seed layer 116 is formed on the photoresist 115 through the steps similar to those shown in FIG. 2 to FIG. 5. A photoresist 118 is further formed. As shown in FIG. 7, the recording gap layer 109 is selectively etched in a portion behind the coils 114a and 117a (the right side of FIG. 7) to form a magnetic path. A top pole 119 of Permalloy, for example, of 3 to 5 µm is then formed. The top pole 119 comes to contact with the bottom pole 107 and is magnetically coupled to the bottom pole 107 in a portion behind the coils 114a and 117a.

As shown in FIG. 8, the recording gap layer 109 and the bottom pole 107 are etched by about 0.5 µm with a pole portion 119a of the top pole 119 as a mask so as to form a trim structure described below. As shown in FIG. 7, an overcoat layer 120 of alumina, for example, is formed to cover the whole surface. FIG. 8 is a cross section of the layered structure of FIG. 7 taken along the plane passing through the MR layer 105 and parallel to an air bearing surface 122. In FIG. 8 the shield gap layers 104 and 106 for electrically isolating the MR layer 105 from the other layers and magnetically shielding the MR layer 105 are separately shown. Lead layers 121a and 121b made of conductive layers for providing electrical connection to the MR layer 105 are shown as well. The overcoat layer 120 is omitted in FIG. 8. Finally, lapping of a slider is performed and the air bearing surface 122 of the recording head and the reproducing head is formed as shown in FIG. 7. The thin-film magnetic head is thus completed.

In FIG. 7, TH represents the throat height and MR-H represents the MR height. Besides the throat height and the MR height, the apex angle indicated with θ in FIG. 7 determines the performance of the thin-film magnetic head. The apex angle is the angle between straight line S passing through the corners of the sides of the photoresists 110, 115 and 118 closer to the air bearing surface and the upper surface of the top pole 119.

In FIG. 8, P2W indicates the magnetic pole width. As shown, the structure is called trim structure wherein the sidewalls of the pole portion 119a of the top pole 119, the recording gap layer 109, and a portion 107a of the bottom pole 107 are vertically formed in a self-aligned manner. The trim structure suppresses an increase in the effective track width due to expansion of the magnetic flux generated during writing of the narrow track.

In practical manufacturing of the thin-film magnetic head, a wafer on which a plurality of structures described above are formed are divided into a plurality of bars on which a plurality of thin-film magnetic heads are arranged. A side of each bar is lapped to obtain the air bearing surface 122 (FIG. 7). During the step of forming the air bearing surface 122, the MR film 105 is lapped as well and composite thin-film magnetic heads each having desired throat and MR heights are obtained. Although the practical thin-film magnetic head has a contact pad for providing electrical connection to the thin-film coils 114a and 117a and the MR film 105, the contact pad is omitted in the drawings described so far.

The composite thin-film magnetic head formed as described above has the following problems with respect to micromachining of the recording head in particular.

In general, a reduction in magnetic path length LM improves characteristics of an induction thin-film magnetic head such as flux rise time, nonlinear transition shift (NLTS) and overwrite. As shown in FIG. 7, magnetic path length LM is the length of part of the bottom pole 107 and the top pole 119 that surrounds the coil 114a of the first layer and the coil 117a of the second layer (that is, the length between the air bearing surface and the opening formed in the recording gap layer 109. The flux rise time is the lapse of time between the point when a current is fed to the thin-film coil made up of the coil 114a and the coil 117a and the point when the flux density in the magnetic circuit made up of the bottom pole 107 and the top pole 119 reaches a specific level. The high frequency characteristic during recording depends on the flux rise time. The nonlinear transition shift is a phenomenon detected during data recording wherein the magnetic flux from the magnetic domain in which immediately previous recording is made produces an interaction with the flux of the recording head and the position of transition (the portion where the magnetization direction is reversed) where another recording is to be made is thereby shifted. The nonlinear transition shift determines not only accuracy of data recording positions but also the surface recording density when data is recorded.

In order to reduce magnetic path length LM, it is required to reduce coil bundle width LC of the coil 114a of the first layer and the coil 117a of the second layer surrounded by the bottom pole 107 and the top pole 119. To reduce coil bundle width LC, it is required to reduce the width of each turn of the coil 114a and the coil 117a (simply called thin-film coil in the following description except where stated otherwise) or to reduce the space between the turns. However, it is difficult to reduce the width of each turn of the thin-film coil and the space between the turns of the thin-film magnetic head of related art described above because of the following reasons.

First, there is a limitation in reducing the width of each turn since the electric resistance of the thin-film coil is required to be reduced. Even if copper whose conductivity is high is used to reduce the resistance of the thin-film coil, the height of at least 2 to 3 μm is required to maintain the cross-sectional area of the thin-film coil. Therefore, the width of the turn of the thin-film coil as narrow as 1.5 μm or below may affect the structural stability. It is thus difficult to further reduce the width of each turn of the thin-film coil.

It is difficult to reduce the space between the turns of the thin-film coil due to the following two reasons.

The first reason is as follows. The thin-film coil of related art described above is formed through electroplating as described with reference to FIG. 3. The thin seed layer 111 is formed beforehand so as to deposit copper evenly throughout the wafer in the opening 113 formed in the photoresist 112. Consequently, the seed layer 111 in the opening 113 is required to be selectively removed to separate the coils after the formation of the coil element 114 in the opening 113 through electroplating. As described with reference to FIG. 5, the seed layer 111 is removed by ion milling using argon, for example, with the coil element 114 as a mask. Basically, ion milling is preferably performed at an angle nearly orthogonal to the substrate surface. However, etched copper is redeposited and the turns of the thin-film coil are shorted and insufficient insulation may result. In order to avoid this, ion milling is required to be performed at an angle of a certain degree with respect to the normal to the substrate. In general, redeposition of etchant is almost prevented if ion milling is performed at an angle as large as 40 to 45 degrees with respect to the normal to the substrate. However, when ion milling is performed at such a large angle, sufficient ion beams are not applied to the part obstructed by the coil element 114 and a large part of the seed layer 111 in the opening 113 remains. Therefore, ion milling is performed at an angle of 5 to 10 degrees in general as described with reference to FIG. 5. However, if a further reduction in the space between the turns of the thin-film coil is intended, an application of sufficient ion beams is not achieved to the part obstructed by the coil element 114 even though the ion milling angle is as small as 5 to 10 degrees. As a result, the seed layer 111 partly remains and causes a short circuit of the turns. If the ion milling angle is 5 to 10 degrees or below as described above, a short circuit of the coils occurs as well due to redeposition of etchant. It is therefore difficult to reduce the space between the turns of the thin-film coil to 2 to 3 μm or below.

The second reason is as follows. In order to reduce the space between the turns of the coil element 114 to 1 μm or below, the helical pattern width (wall thickness) of the photoresist 112 is required to be narrow (thin). In addition, the depth of the opening 113, that is, the thickness of the photoresist 112 is required to be 3 to 4 μm so as to make the height of the thin-film coil 2 to 3 μm as described above. However, an electrolyte such as copper sulfate is required to be stirred in order to obtain an even thickness of the film when the thin-film coil is formed through electroplating as described with reference to FIG. 3. Consequently, if the helical pattern width (wall thickness) of the photoresist 112 is made too thin in order to reduce the space between the turns of the coil element 114, the thin wall collapses due to stirring of the electrolyte and correct formation of the thin-film coil is made impossible. It is therefore difficult to reduce the space between the turns of the thin-film coil.

It is difficult to make the width of each turn of the thin-film coil and the space between the turns narrower than those of the related art magnetic head because of the reasons described so far. Consequently, a reduction in coil bundle width LC is difficult.

In order to improve the NLTS characteristic of the recording head mentioned above, the number of turns of the thin-film coil may be increased. However, the number of layers of the thin-film coil layers is required to be increased to four to five in order to increase the number of turns without increasing coil bundle width LC nor without reducing the width of each turn of the thin-film coil and the space between the turns. However, if the number of layers of the thin-film coil layers is increased, apex angle θ described above is made large and it is impossible to achieve the narrow track width (narrowing magnetic pole width P2W of FIG. 8). In order to maintain apex angle θ within a specific range, the number of thin-film coil layers is required to be three or below or preferably two or below. However, it is impossible to increase the number of turns and it is therefore difficult to improve the NLTS characteristic.

The publications relating to the thin-film magnetic head include: Japanese Patent Application Laid-open Sho 63-204504 (1988), Japanese Patent Publication Sho 55-41012 (1980) (U.S. Pat. No. 4,416,056), Japanese Patent Application Laid-open Hei 02-27508 (1990), Japanese Patent Application Laid-open Hei 02-302920 (1990) (U.S. Pat. No. 5,065,270), Japanese Patent Application Laid-open Hei 05-242430 (1993), Japanese Patent Application Laid-open Hei 02-14417 (1990), Japanese Patent Application Laid-open Hei 05-182135 (1993).

SUMMARY OF THE INVENTION

The invention is designed to overcome the foregoing problems. It is an object of the invention to provide a thin-film magnetic head and a method of manufacturing the same for improving the characteristics through a reduction in magnetic path length by reducing the coil bundle width.

A thin-film magnetic head of the invention includes: at least two magnetic layers including two magnetic poles magnetically coupled to each other, part of sides of the magnetic poles facing a recording medium being opposed to each other with a gap layer in between; and a thin-film coil unit placed between the magnetic layers or between other magnetic layers each coupled to the magnetic layers. The thin-film coil unit includes: a helical-shaped first thin-film coil; an insulating film covering at least a bottom and sides of a helical groove which is a region between turns of the first thin-film coil; and a second thin-film coil embedded at least inside the helical groove covered with the insulating film so as to directly come to contact with the insulating film.

In the thin-film magnetic head of the invention, the second thin-film coil is embedded at least inside the helical groove covered with the insulating film covering at least the bottom and sides of the helical groove which is the region between the turns of the first thin-film coil such that the second thin-film coil directly comes to contact with the insulating film. The description 'the second thin-film coil is embedded such that the second thin-film coil directly comes to contact with the insulating film' means that the space inside the helical groove covered with the insulating film is filled with the second thin-film coil with no clearance without any layer in between. Such a structure allows the first and second thin-film coils to belong to one layer with the insulating film in between. The pitch of the turns of the thin-film coil unit of the single layer is therefore substantially reduced.

In the thin-film magnetic head of the invention, the first thin-film coil or the second thin-film coil may include a thin base conductive film and a conductive plating layer selectively formed from the base conductive film as a seed layer.

In the thin-film magnetic head of the invention, the second thin-film coil may include a vapor phase growth conductive layer formed through vapor phase growth. In this case, chemical vapor deposition may be used as the vapor phase growth.

Another thin-film magnetic head of the invention includes: at least two magnetic layers including two magnetic poles magnetically coupled to each other, part of sides of the magnetic poles facing a recording medium being opposed to each other with a gap layer in between; and a thin-film coil unit placed between the magnetic layers or between other magnetic layers each coupled to the magnetic layers. The thin-film coil unit includes: a helical-shaped first thin-film coil; an insulating film covering at least a bottom and sides of a helical groove which is a region between turns of the first thin-film coil; a conductive film covering at least the bottom and the sides of the helical groove covered with the insulating film; insulator sidewalls covering only part of the conductive film on the sides of the helical groove; and a second thin-film coil embedded at least inside the helical groove covered with the conductive film and the insulator sidewalls.

In the thin-film magnetic head of the invention described above, the second thin-film coil is embedded at least inside the helical groove which is the region between the turns of the first thin-film coil. The second thin-film coil is isolated from the first thin-film coil by the insulating film. Such a structure allows the first and second thin-film coil to belong to one layer with the insulating film in between. The pitch of the turns of the thin-film coil unit of the single layer is therefore reduced. In addition, the insulating film inside the helical groove is covered with the conductive film having a specific function. The conductive film on the sides of the helical groove is covered with the insulator sidewalls so that the function thereof is inhibited.

In the thin-film magnetic head, the conductive film may function as a base conductive film used when the second thin-film coil is formed. To be specific, the conductive film may function as a seed layer for growing the second thin-film coil. In this case, the insulator sidewalls have a function of inhibiting growth of the second thin-film coil from the conductive layer on the sides of the helical groove as a seed layer. The second thin-film coil may be formed through plating growth from the conductive layer exposed at the bottom of the helical groove as a seed layer.

In the thin-film magnetic head, the first thin-film coil may include a thin base conductive film and a conductive plating layer selectively formed from the base conductive film as a seed layer.

In the thin-film magnetic head, the insulator sidewalls may be made of inorganic insulating films. The inorganic insulating films may be made of aluminum oxide.

In the thin-film magnetic head or the other thin-film magnetic head of the invention, the insulating film may reach the top of the first thin-film coil. In this case, the second thin-film coil may further cover part of the top of the first thin-film coil with the insulating film in between.

In the thin-film magnetic head or the other thin-film magnetic head of the invention, the thin-film coil unit may further include a third thin-film coil formed in a layer other than the first and second thin-film coils with an interlayer insulator in between. The third thin-film coil connects an internal end of the first thin-film coil to an external end of the second thin-film coil or an external end of the first thin-film coil to an internal end of the second thin-film coil.

In the thin-film magnetic head or the other thin-film magnetic head of the invention, the insulating film may be made of an inorganic insulating film. The inorganic insulating film may be made of aluminum oxide.

In the thin-film magnetic head or the other thin-film magnetic head of the invention, the insulating film may preferably have such a thickness that a groove shape corresponding to the helical groove remains when the insulating film covers at least the bottom and the sides of the helical groove which is the region between the turns of the first thin-film coil.

In the thin-film magnetic head or the other thin-film magnetic head of the invention, a plurality of the thin-film coil units may be formed in layers with an interlayer insulator in between.

The thin-film magnetic head or the other thin-film magnetic head of the invention may further include a magnetoresistive element for reading.

A method of the invention is provided for manufacturing a thin-film magnetic head including: at least two magnetic layers including two magnetic poles magnetically coupled to each other, part of sides of the magnetic poles facing a recording medium being opposed to each other with a gap layer in between; and a thin-film coil unit placed between the magnetic layers or between other magnetic layers each coupled to the magnetic layers. Steps of forming the thin-film coil unit include the steps of: forming a helical-shaped first thin-film coil; forming an insulating film covering at least a bottom and sides of a helical groove which is a region between turns of the first thin-film coil; and forming a second thin-film coil embedded at least inside the helical groove covered with the insulating film so as to directly come to contact with the insulating film.

In the method of manufacturing a thin-film magnetic head of the invention, the step of forming the first thin-film coil or the step of forming the second thin-film coil may include the steps of: forming a thin base conductive film and effecting selective plating growth from the base conductive film as a seed layer.

In the method of manufacturing a thin-film magnetic head of the invention, the step of forming the second thin-film coil may include the steps of effecting selective vapor phase growth. The step of effecting selective vapor phase growth may be achieved through chemical vapor deposition.

Another method of the invention is provided for manufacturing a thin-film magnetic head including: at least two magnetic layers including two magnetic poles magnetically coupled to each other, part of sides of the magnetic poles facing a recording medium being opposed to each other with a gap layer in between; and a thin-film coil unit placed between the magnetic layers or between the magnetic layers and another magnetic layer coupled to the magnetic layers. Steps of forming the thin-film coil unit include the steps of: forming a helical-shaped first thin-film coil; forming an insulating film covering at least a bottom and sides of a helical groove which is a region between turns of the first thin-film coil; forming a conductive film covering at least the bottom and the sides of the helical groove covered with the insulating film; forming insulator sidewalls covering only part of the conductive film on the sides of the helical groove; and forming a second thin-film coil embedded at least inside the helical groove covered with the conductive film and the insulator sidewalls.

In the method, the conductive film may function as a base conductive film used when the second thin-film coil is formed. To be specific, the conductive film may function as a seed layer for growing the second thin-film coil. In this case, the insulator sidewalls have a function of inhibiting growth of the second thin-film coil from the conductive layer on the sides of the helical groove as a seed layer. The second thin-film coil may be formed through plating growth from the conductive layer exposed at the bottom of the helical groove as a seed layer.

In the method, the step of forming the first thin-film coil may include the steps of forming a thin base conductive film and effecting selective plating growth from the base conductive film as a seed layer.

In the method, the insulator sidewalls may be made of inorganic insulating films. The inorganic insulating films may be made of aluminum oxide.

In the method or the other method of the invention, the insulating film may reach the top of the first thin-film coil. In this case, the second thin-film coil may further cover part of the top of the first thin-film coil with the insulating film in between.

The method or the other method of the invention may further include the step of forming a third thin-film coil formed in a layer other than the first and second thin-film coils with an interlayer insulator in between. The third thin-film coil connects an internal end of the first thin-film coil to an external end of the second thin-film coil or an external end of the first thin-film coil to an internal end of the second thin-film coil.

In the method or the other method of the invention, the insulating film may be made of an inorganic insulating film. The inorganic insulating film may be made of aluminum oxide.

In the method or the other method of the invention, the insulating film may preferably have such a thickness that a groove shape corresponding to the helical groove remains when the insulating film covers at least the bottom and the sides of the helical groove which is the region between the turns of the first thin-film coil.

In the method or the other method of the invention, a plurality of the thin-film coil units may be formed in layers with an interlayer insulator in between.

The method or the other method of the invention may further include the step of forming a magnetoresistive element for reading.

Other and further objects, features and advantages of the invention will appear more fully from the following description.

BRIEF DESCRIPTION OF THE DRAWINGS

FIG. 9A and FIG. 9B are cross sections for illustrating a step in a method of manufacturing a thin-film magnetic head of a first embodiment of the invention.

FIG. 10A and FIG. 10B are cross sections for illustrating a step that follows FIG. 9A and FIG. 9B.

FIG. 11A and FIG. 11B are cross sections for illustrating a step that follows FIG. 10A and FIG. 10B.

FIG. 12A and FIG. 12B are cross sections for illustrating a step that follows FIG. 11A and FIG. 11

FIG. 13A and FIG. 13B are cross sections for illustrating a step that follows FIG. 12A and FIG. 12B.

FIG. 29A and FIG. 29B are top views of the thin-film magnetic heads for illustrating the magnetic path length of the related-art thin-film magnetic head shown in FIG. 7 and the magnetic path length of the thin-film magnetic head of the embodiment of the invention shown in FIG. 27, compared with each other.

FIG. 32A and FIG. 32B are cross sections for illustrating a step in a method of manufacturing a thin-film magnetic head of a second embodiment of the invention.

FIG. 33A and FIG. 33B are cross sections for illustrating a step that follows FIG. 32A and FIG. 32B.

FIG. 34A and FIG. 34B are cross sections for illustrating a step that follows FIG. 33A and FIG. 33B.

FIG. 35A and FIG. 35B are cross sections for illustrating a step that follows FIG. 34A and FIG. 34B.

FIG. 36A and FIG. 36B are cross sections for illustrating a step that follows FIG. 35A and FIG. 35B.

DETAILED DESCRIPTION OF THE PREFERRED EMBODIMENTS

Figure 1:
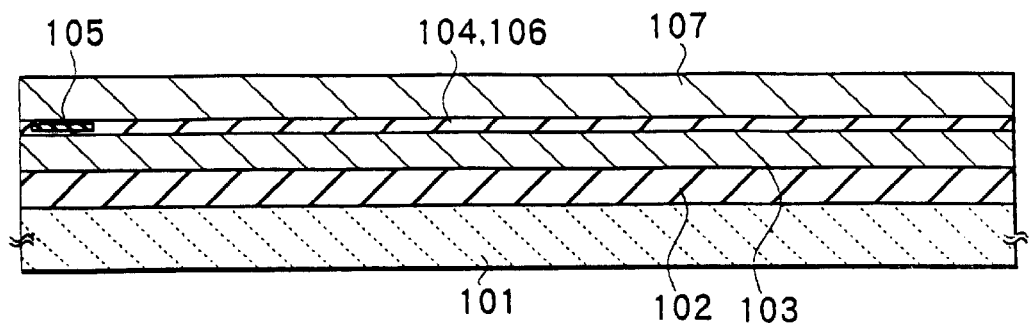
FIG. 1 is a cross section for illustrating a step in a method of manufacturing a related-art thin-film magnetic head.
Figure 2:
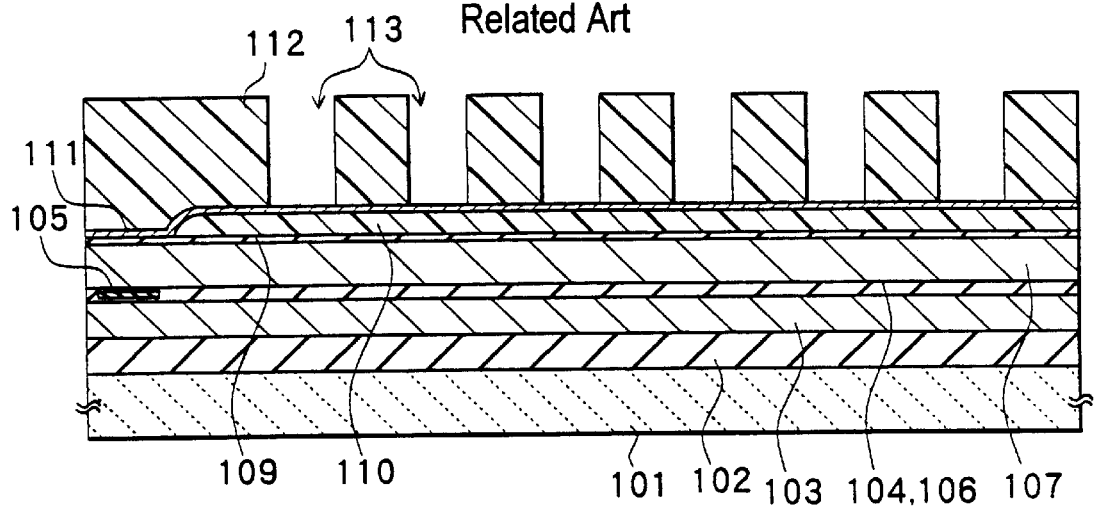
FIG. 2 is a cross section for illustrating a step that follows FIG. 1.
Figure 3:
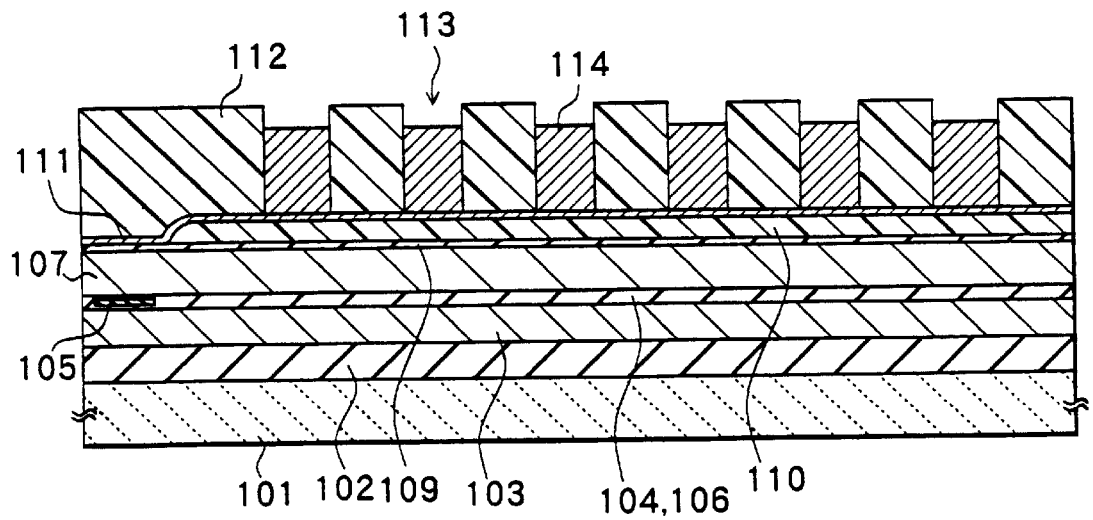
FIG. 3 is a cross section for illustrating a step that follows FIG. 2.
Figure 4:
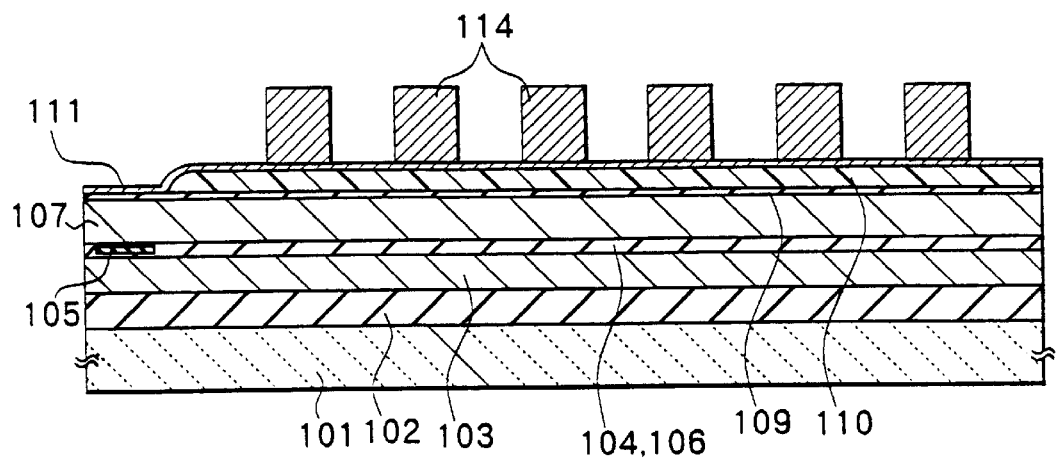
FIG. 4 is a cross section for illustrating a step that follows FIG. 3.

Preferred embodiment of the invention will now be described in detail with reference to the accompanying drawings.

[First Embodiment]

FIG. 9A and FIG. 9B to FIG. 20A and FIG. 20B illustrate manufacturing steps of a composite thin-film magnetic head as a method of manufacturing a thin-film magnetic head of an embodiment of the invention. FIG. 9A to FIG. 20A are cross sections each orthogonal to an air bearing surface. FIG. 9B to FIG. 20B are cross sections of a pole portion each parallel to the air bearing surface. A thin-film magnetic head of the embodiment of the invention implemented through the method of manufacturing a thin-film magnetic head of the embodiment will be described as well.

In the method of the embodiment, as shown in FIG. 9A and FIG. 9B, an insulating layer 2 made of alumina (aluminum oxide [$Al_2O_3$]) for example, of about 5 μm in thickness is deposited on a substrate 1 made of aluminum oxide and titanium carbide ($Al_2O_3$—TiC), for example. Next, as shown in FIG. 10A and FIG. 10B, Permalloy (NiFe) of about 2 to 3 μm in thickness is selectively formed on the insulating layer 2 by plating with a photoresist (not shown) as a mask to form a bottom shield layer 3 for a reproducing head.

Next, as shown in FIG. 11A and FIG. 11B, on the bottom shield layer 3 alumina of 100 to 200 nm in thickness, for example, is deposited through sputtering to form a shield gap film 4. On the shield gap film 4 an MR film 5 of tens of nanometers in thickness for making up an MR element for reproducing is formed and a desired shape is obtained through high-precision photolithography. Next, a shield gap film 6 is formed on the shield gap film 4 and the MR film 5, and the MR film 5 is buried in the shield gap films 4 and 6. Although not shown, a pair of lead layers for providing electrical connection to the MR film 5 are selectively formed as well. The MR film 5 corresponds to a 'magnetoresistive element for reading' of the invention.

Next, as shown in FIG. 12A and FIG. 12B, on the shield gap film 6 a top shield-cum-bottom pole (called bottom pole in the following description) 7 of Permalloy, for example, of about 3 to 4 μm in thickness is selectively formed by plating, for example. The bottom pole 7 corresponds to one of 'two magnetic layers' of the invention.

Next, an inorganic insulating film, such as a silicon dioxide film ($SiO_2$) of about 1 to 2 μm in thickness is formed on the bottom pole 7. The insulating film is selectively patterned through taper etching to form an insulating film 8 for defining the apex angle and throat height. For the etching, dry etching, particularly reactive ion etching (RIE) is performed. RIE using a gas such as boron trichloride ($BCl_3$), chlorine ($Cl_2$), carbon tetrafluoride ($CF_4$), sulfur hexafluoride ($SF_6$) is preferred. For the insulating layer 8, not only a silicon dioxide film but also an alumina film or a silicon nitride (SiN) film may be used. Alternatively, a photoresist layer may be used for the insulating layer 8.

Next, as shown in FIG. 13A and FIG. 13B, a recording gap layer 9 made of a nonmagnetic material such as alumina or aluminum nitride having a thickness of about 100 to 300 nm is formed to cover the insulating layer 8 and the bottom pole 7. An opening 20 is then formed in the region connecting the bottom pole 7 to a top pole described below (the right-side region of FIG. 13A).

Next, as shown in FIG. 13A and FIG. 13B, a magnetic layer of Permalloy, for example, having a thickness of about 3 to 4 μm is formed and then patterned by etching to form top pole tips 10a and 10b. The top pole tip 10a extends from the side to be the air bearing surface through one of tapered sections of the insulating layer 8 to part of the insulating layer 8 closer to the air bearing surface. The top pole tip 10b covers the opening 20 of the recording gap layer 9 described above and extends through the other of the tapered sections of the insulating layer 8 to part of the insulating layer 8 opposed to the air bearing surface. The top pole tip 10b is thereby brought to contact with the bottom pole 7 through the opening 20 of the recording gap layer 9 described above and magnetically coupled to the bottom pole 7.

Next, as shown in FIG. 13B, the recording gap layer 9 and the bottom pole 7 are etched by about 0.5 μm with the top pole tip 10a as a mask so as to form a trim structure.

Figure 14A:
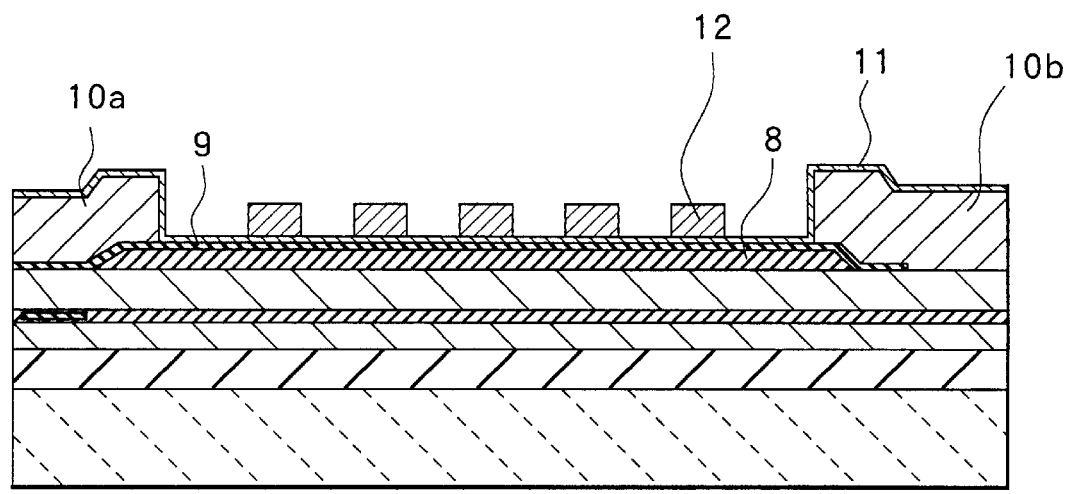
FIG. 14A and FIG. 14B are cross sections for illustrating a step that follows FIG. 13A and FIG. 13B.
Figure 14B:
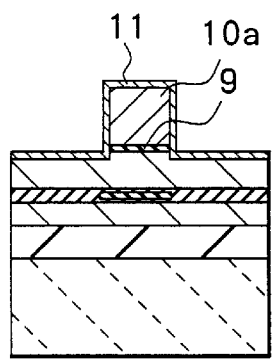

Next, as shown in FIG. 14A and FIG. 14B, a thin seed layer 11 made of copper, for example, of about 50 to 100 nm in thickness is formed through sputtering and so on over the whole surface. As in the example of manufacturing steps of related art described above, copper is selectively formed on the seed layer 11 by electroplating through a process using photolithography to form a coil element 12. The seed layer 11 corresponds to a 'base conductive film' of the invention. The coil element 12 corresponds to a 'conductive plating layer' of the invention.

To be specific, a thick photoresist (not shown) of 3.0 to 4.0 μm in thickness is formed on the seed layer 11. A helical opening (not shown) that reaches the seed layer 11 is formed in the photoresist by photolithography. The depth of the opening is equal to the thickness of the photoresist and the width of the opening is about 1.5 to 2.0 μm. The width of the helical photoresist pattern formed by the opening is about 1.5 to 2.5 μm. Next, copper electroplating is performed with copper sulfate to form the coil element 12 to make up a first coil in the opening of the photoresist. Accordingly, the width of each turn of the coil element 12 is about 1.5 to 2.0 μm and the space between the turns is about 1.5 to 2.5 μm. The thickness of the coil element 12 is preferably thinner than the depth of the opening of the photoresist and may be 2.5 to 3.0 μm.

The pattern width of the photoresist used for the selective electroplating (1.5 to 2.5 μm) is relatively long, that is, about half the thickness thereof (3.0 to 4.0 μm), and provides a steady structure. As a result, there is little chance that the photoresist collapses when the electrolyte is stirred during the electroplating process.

Figure 15A:
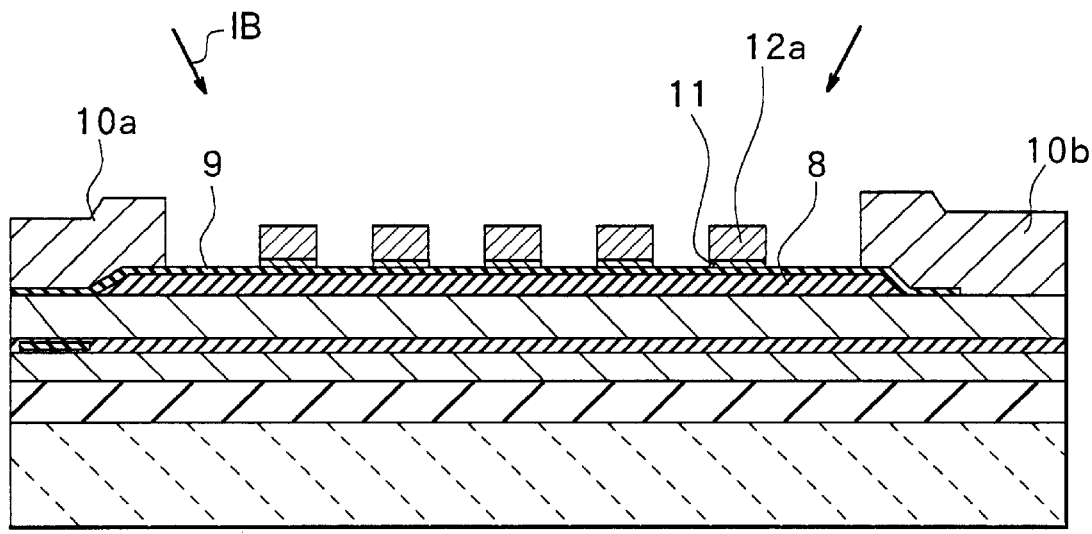
FIG. 15A and FIG. 15B are cross sections for illustrating a step that follows FIG. 14A and FIG. 14B.
Figure 15B:
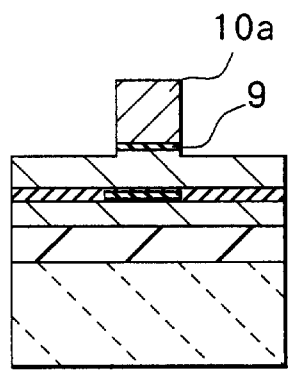

The photoresist described above used for the selective electroplating is then removed. As shown in FIG. 15A and FIG. 15B, ion milling with argon ion beams IB, for example, is performed to remove the seed layer 11 at the bottom of the region (the concave portion) between the turns of the coil element 12 and separate the turns of the coil element 12 from one another so as to form a first coil 12a. The ion milling is performed at an angle of 5 to 10 degrees. If ion milling is performed at an angle nearly orthogonal to the substrate in such a manner, the material of the seed layer 11 may scatter with the impact of ion beams and redeposit. However, the space between the turns of the coil element 12 is relatively long, that is, about 1.5 to 2.5 μm as described above in the embodiment of the invention. As a result, there is little chance that the turns short-circuit due to redeposition of scattered seed layer material. Complete separation of the turns of the coil element 12 is thus achieved. Furthermore, since the wide space is allowed between the turns of the coil element 12, a sufficient ion application to the part obstructed by the coil element 12 is achieved as well. The seed layer 11 is thereby prevented from partly remaining. The first coil 12a corresponds to a 'first thin-film coil' of the invention.

Figure 16A:
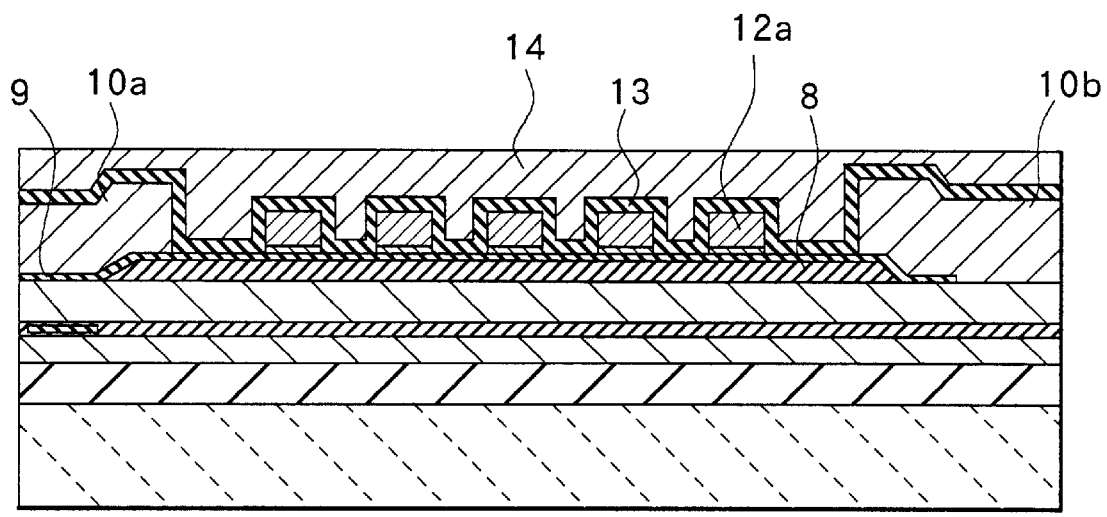
FIG. 16A and FIG. 16B are cross sections for illustrating a step that follows FIG. 15A and FIG. 15B.
Figure 16B:
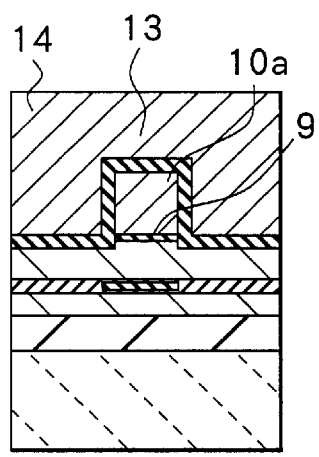

Next, as shown in FIG. 16A and FIG. 16B, an insulating film 13 of alumina, for example, whose thickness is about 300 to 500 nm is formed over the whole surface. A conductive layer 14 of copper, for example, whose thickness is about 3.0 to 4.0 nm is formed to cover the projections and depressions of the whole surface. The insulating film 13 may be made of any of silicon dioxide, alumina nitride and so on. The inside of the helical groove of the first coil 12a covered with the insulating film 13 is completely filled with the conductive layer 14. The conductive layer 14 is preferably formed through vapor phase growth, particularly, metal organic CVD (MO-CVD). The MO-CVD may be performed with copper hexafluoroacetylacetonate (hfac) and trimethylvinylsilane (tmvs) at a temperature of about 150 to 200° C. The insulating film 13 corresponds to an 'insulating film' of the invention. The conductive layer 14 corresponds to a 'vapor phase growth conductive layer' of the invention.

Instead of MO-CVD, the conductive layer 14 may be formed through electroplating or vapor phase growth such as sputtering and so on. For electroplating, a seed layer of copper, for example, whose thickness is about 50 to 100 nm is formed over the whole surface by sputtering. A copper layer is then grown from the seed layer in an electrolyte such as copper sulfate.

In order to prevent separation of the conductive layer 14 and to allow even formation of the conductive layer 14, a base layer of any of titanium (Ti), titanium nitride (TiN), tantalum nitride (TaN) and so on may be formed by CVD or sputtering before the formation of the conductive layer 14.

Figure 17A:
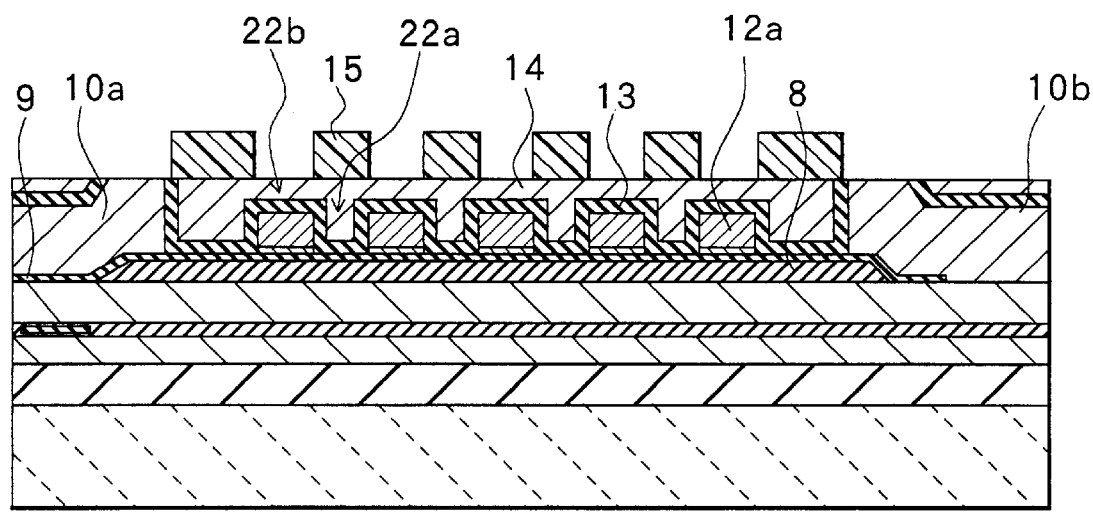
FIG. 17A and FIG. 17B are cross sections for illustrating a step that follows FIG. 16A and FIG. 16B.
Figure 17B:
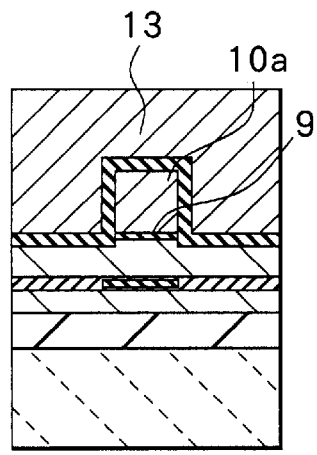

Next, as shown in FIG. 17A and FIG. 17B, the whole surface is ground by a specific amount through chemical mechanical polishing (CMP). The amount of grinding is such that the conductive layer 14 on top of the coil 12a slightly remains and part of the top pole tips 10a and 10b is exposed, as shown.

Next, as shown in FIG. 17A and FIG. 17B, a helical photoresist pattern 15 is formed by photolithography on the conductive layer 14 in the region where the first coil 12a is formed. The photoresist pattern 15 passes directly above a helical groove 22a of the first coil 12a covered with the insulating film 13 and covers part of helical plateau (turn) 22b.

Figure 18A:
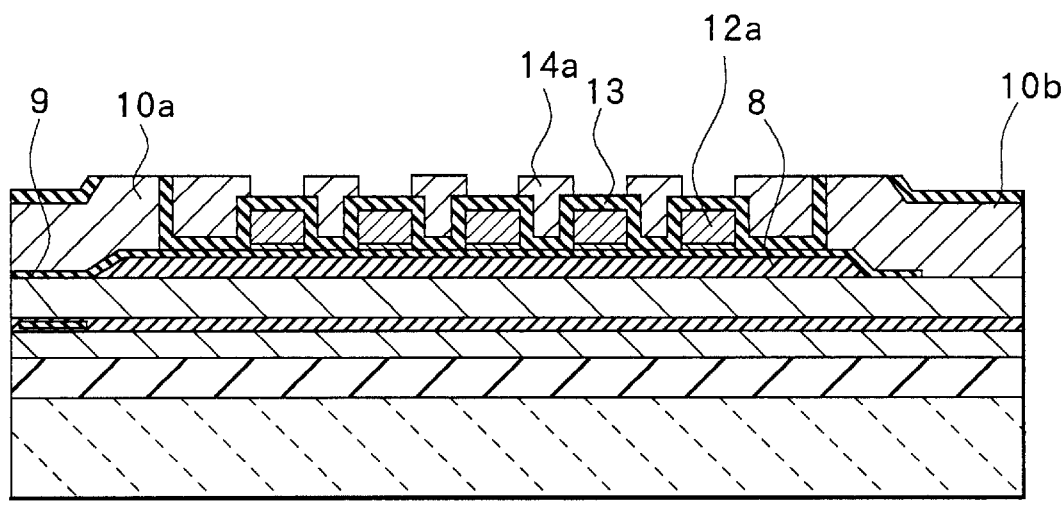
FIG. 18A and FIG. 18B are cross sections for illustrating a step that follows FIG. 17A and FIG. 17B.
Figure 18B:
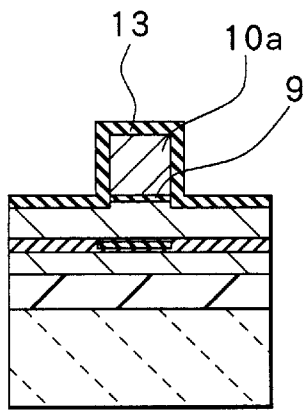

Next, as shown in FIG. 18A and FIG. 18B, the conductive layer 14 is etched by ion milling or sputtering with the photoresist pattern 15 as a mask until the top surface of the insulating film 13 on the first coil 12a is exposed. A second coil 14a is thereby fabricated. The photoresist pattern 15 is then removed. The second coil 14a having a T-shaped cross section is thus formed which extends from the inside of the helical groove of the first coil 12a covered with the insulating film 13 to top of the helical plateau (turns). Because of the T-shaped cross section, the cross-sectional area of the second coil 14a is increased. The second coil 14a corresponds to a 'second thin-film coil' of the invention.

Figure 19A:
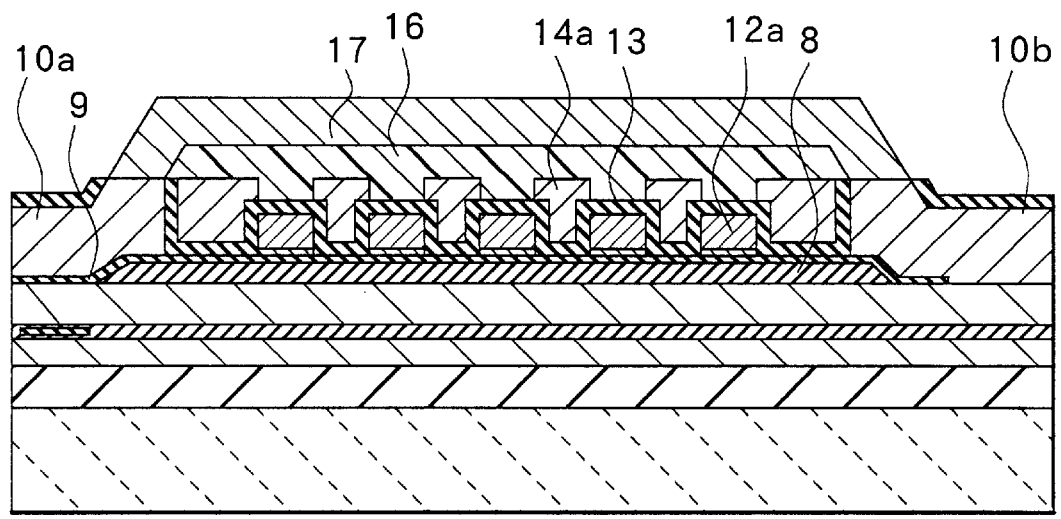
FIG. 19A and FIG. 19B are cross sections for illustrating a step that follows FIG. 18A and FIG. 18B.
Figure 19B:
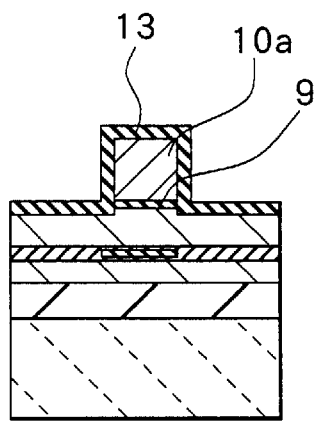

Next, as shown in FIG. 19A and FIG. 19B, a photoresist 16 is selectively formed mainly on the region where the first coil 12a and the second coil 14a are formed. As shown, a top pole 17 of Permalloy, for example, of 3 to 5 μm in thickness is then selectively formed by plating, for example. The top pole 17 comes to contact with the top pole tip 10a to be magnetically coupled thereto in the front end region of the insulating layer 8. The top pole 17 comes to contact with the top pole tip 10b to be magnetically coupled thereto in the rear end region of the insulating layer 8. A magnetic path is thereby formed by the top pole tip 10a, the top pole 17, the top pole tip 10b and the bottom pole 7. The top pole tip 10a corresponds to the other of the 'two magnetic layers' of the invention. The top pole 17 corresponds to 'another magnetic layer' of the invention.

Figure 20A:
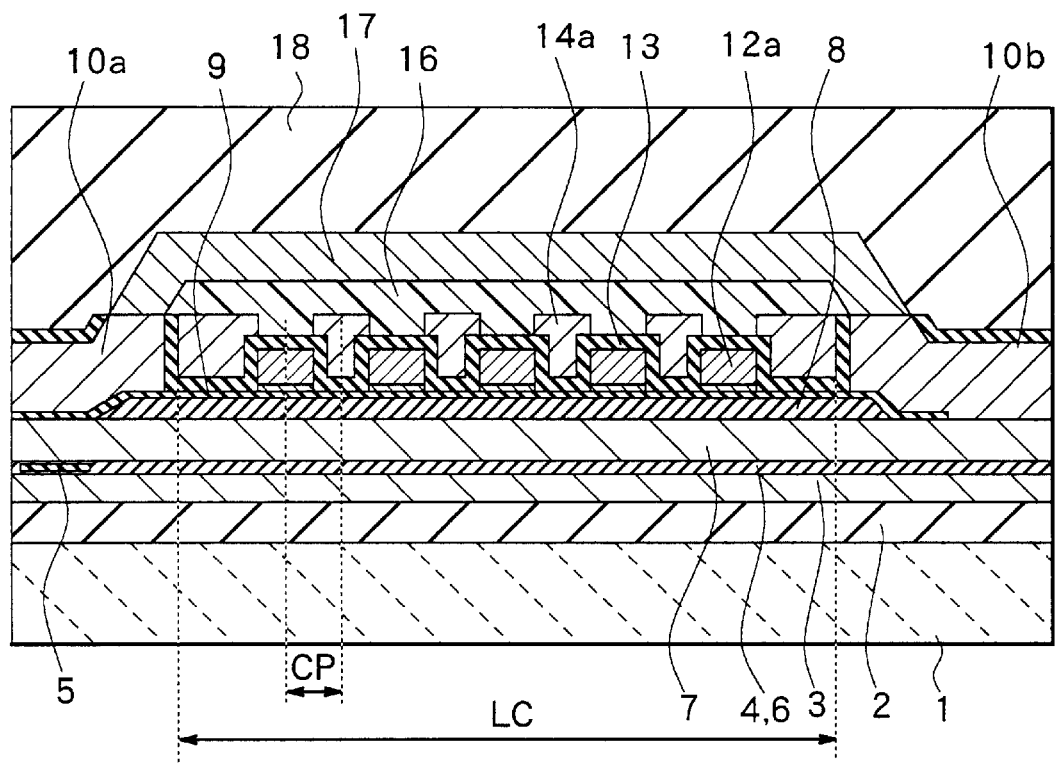
FIG. 20A and FIG. 20B are cross sections for illustrating a step that follows FIG. 19A and FIG. 19B.
Figure 20B:
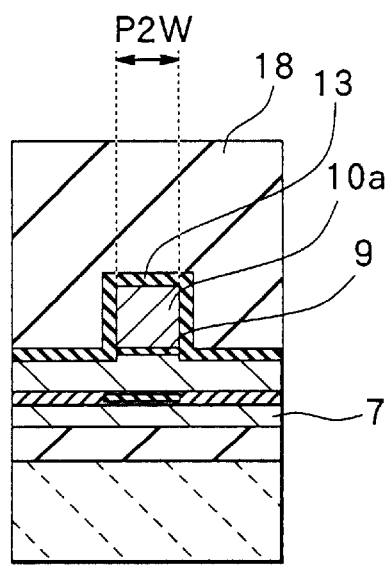

As shown in FIG. 20A and FIG. 20B, an overcoat layer 18 of alumina, for example, is formed to cover the whole surface. Finally, lapping of a slider is performed and the air bearing surface of the recording head and the reproducing head is formed. The composite thin-film magnetic head is thus completed.

Figure 21:
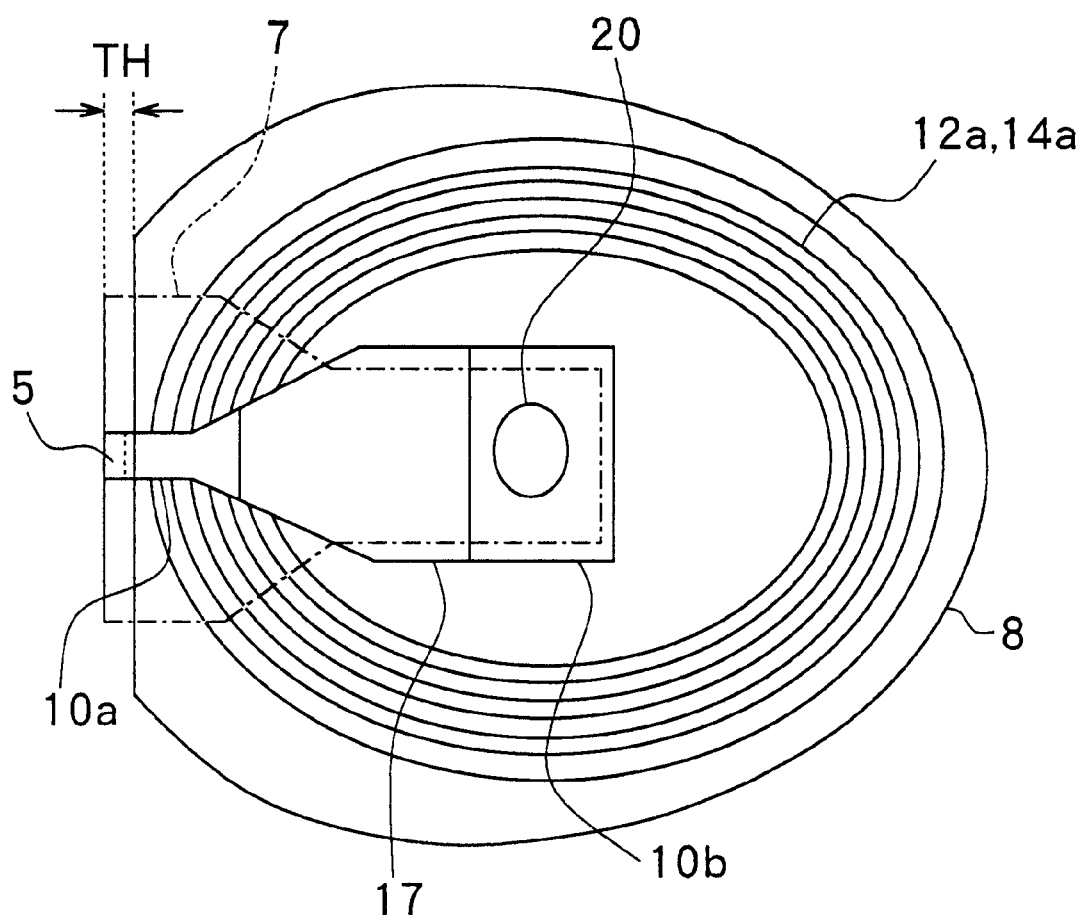
FIG. 21 is a top view of the thin-film magnetic head manufactured through the method of the embodiment of the invention.

FIG. 21 is a top view of the composite thin-film magnetic head made through the manufacturing method of the embodiment of the invention. In FIG. 21 the essential layers are only shown and the other layers such as the overcoat layer are omitted. Letters TH indicates the throat height defined by the end of insulating layer 8 on the air bearing surface side. The bottom pole 7 and the top pole 17 are coupled to each other through the opening 20 (see FIG. 13A) formed in the recording gap layer 9 not shown in FIG. 21.

Figure 22:
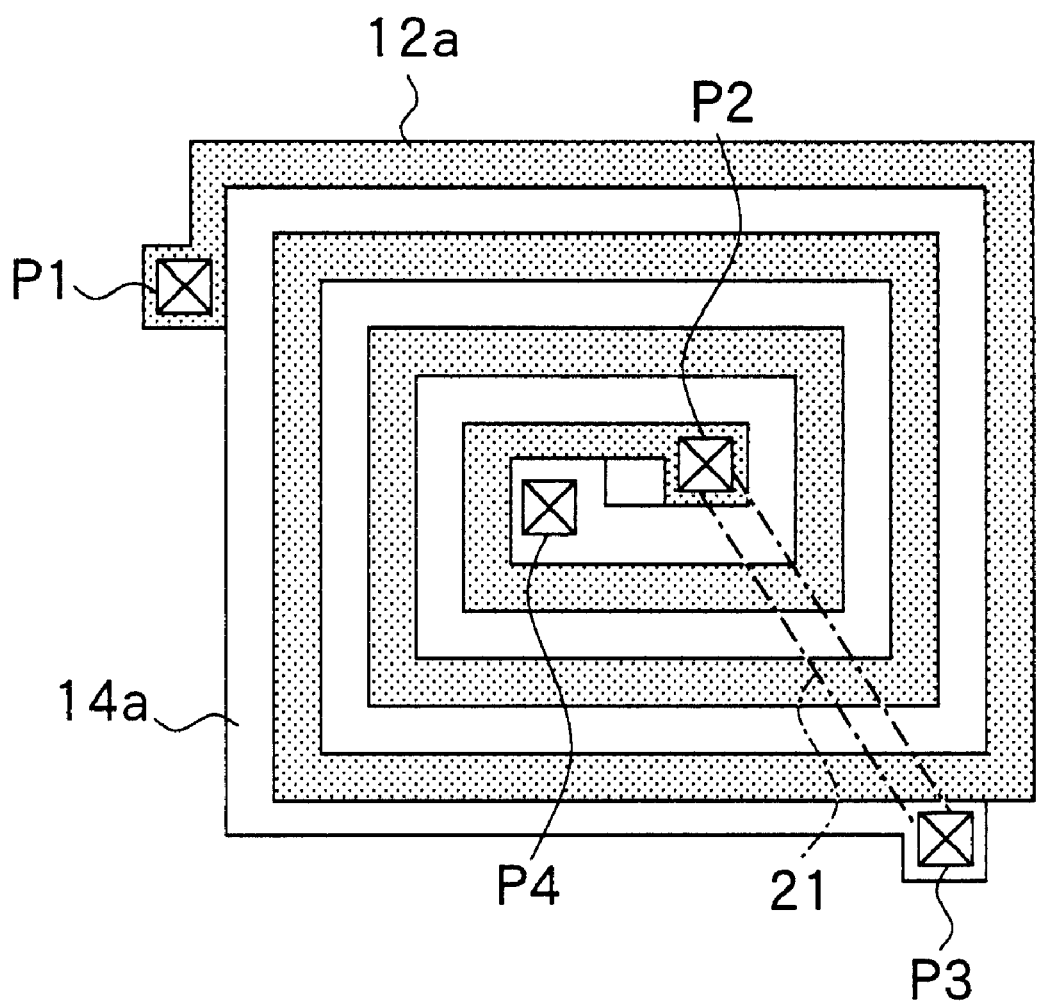
FIG. 22 is a schematic top view for illustrating the first and second coils of the thin-film magnetic head shown in FIG. 21 and the manner in which the coils are connected.

FIG. 22 is a schematic line drawing illustrating the direction of turning of the first coil 12a and the second coil 14a and the state of connection. Although the coils 12a and 14a surround the part coupling the bottom pole 7 and the top pole 17 (the opening 20 shown in FIG. 21) in the practical thin-film magnetic head, the part is omitted in FIG. 22. As shown, the coils 12a and 14a are interlaced. The direction of turning of each coil is invariably the same, referred to the direction in which the radius of the turn of each coil decreases. The direction of turning is called right-handed wind in this description.

In FIG. 22 a contact pad P1 formed at the outer end of the first coil 12a is connected to a first external terminal (not shown) with a lead not shown. A contact pad P2 formed at the inner end of the first coil 12a is connected to a contact pad P3 formed at the outer end of the second coil 14a with a straight-line-shaped relay lead 21 selectively formed in a layer other than the first coil 12a and the second coil 14a. A contact pad P4 formed at the inner end of the second coil 14a is connected to a second external terminal (not shown) with another lead not shown. That is, the first coil 12a and the second coil 14a are both connected in series through the relay lead 21 to be right-handed winding. An application of voltage across the first and second external terminals allows a current to pass through the first coil 12a and the second coil 14a in the same direction. A magnetic flux is thereby generated in the magnetic path made up of the top pole tip 10a, the top pole 17, the top pole tip 10b and the bottom pole 7. Magnetic recording is made on a recording medium not shown by means of a magnetic flux generated between the top pole tip 10a and the bottom pole 7 which face each other with the recording gap layer 9 in between.

According to the embodiment described so far, the second coil 14a is buried in the helical groove-shaped concave of the first coil 12a covered with the insulating film 13 so that the second coil 14a directly touches the insulating film 13. As a result, the turn pitch of the thin-film coil is reduced without particularly improving the process accuracy in the manufacturing steps of the first coil 12a. The 'turn pitch of the thin-film coil' means the pitch of the turns in a single layer.

Figure 7:
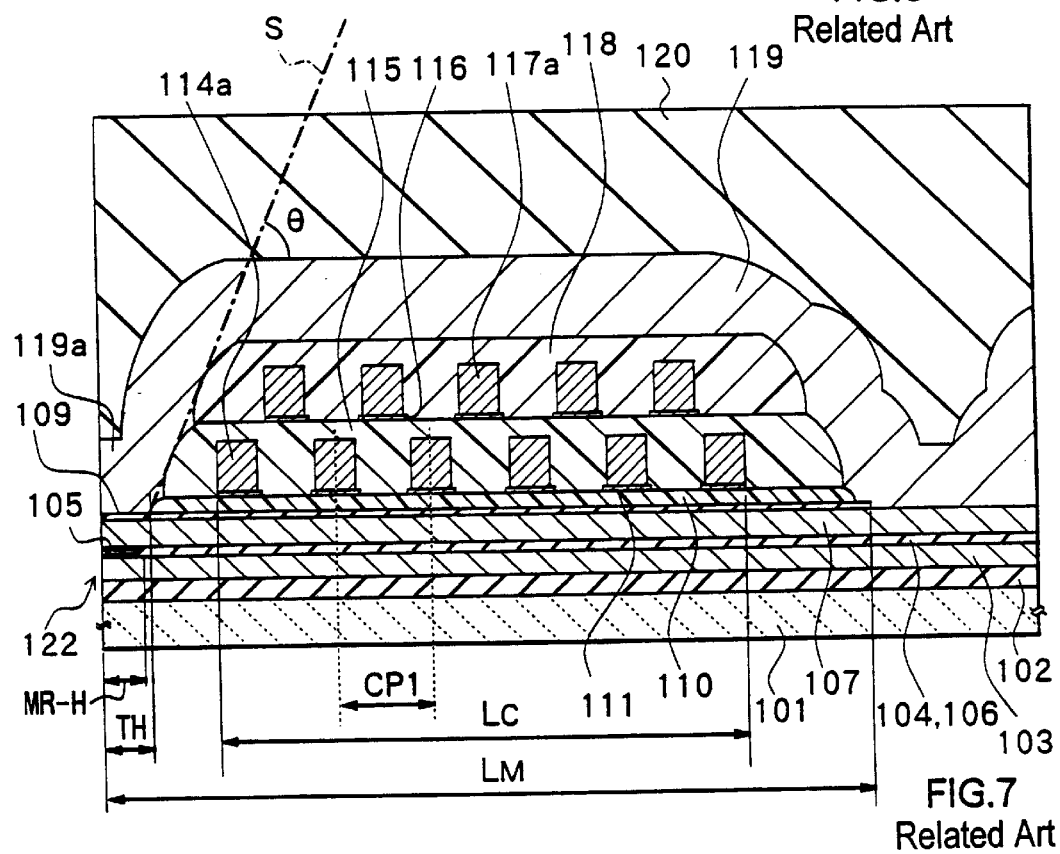
FIG. 7 is a cross section for illustrating a step that follows FIG. 6.
Figure 8:
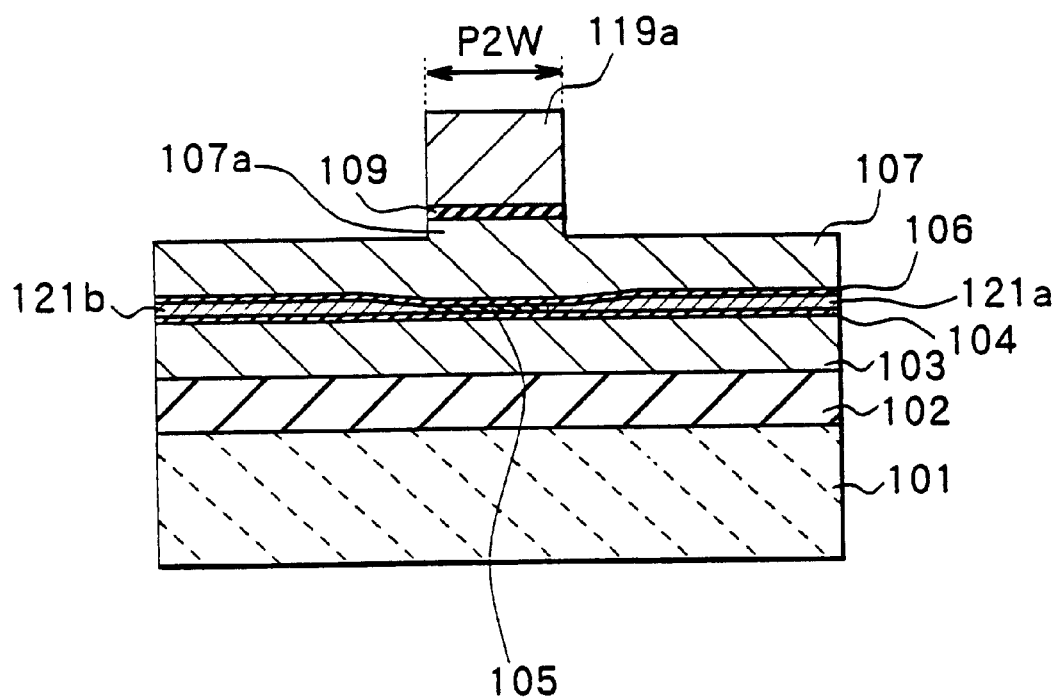
FIG. 8 is a cross section parallel to the air bearing surface of the thin-film magnetic head shown in FIG. 7.

In the related-art technique shown in FIG. 7, the coil 114a of the first layer and the coil 117a of the second layer are formed in the different layers in order to increase the number of turns of the thin-film coil. If the coils were to be formed in a single layer, the coil 117a and the coil 114a would be placed side by side. Consequently, coil bundle width LC is considerably extended and magnetic path length LM is thereby increased as well. The turn pitch in a single layer described above is CP1, that is, the pitch of the coil 114a or the coil 117a as shown in FIG. 7.

In the embodiment of the invention, in contrast, the second coil 14a is buried in the helical groove of the first coil 12a covered with the insulating film 13 as shown in FIG. 20A. Therefore, the 'turn pitch of the thin-film coil' that is, turn pitch CP2 in the single layer of the thin-film coil including both of the first coil 12a and the second coil 14a is about half of turn pitch CP1 in the single layer of the related-art magnetic head shown in FIG. 7. It is thus possible to increase the number of turns without increasing the layers of the thin-film coil nor without increasing coil bundle width LC. In other words, coil bundle width LC may be reduced without reducing the space between the turns of the first coil 12a and between the turns of the second coil 14a as long as the number of layers and the number of turns of the thin-film coil are constant. A reduction in coil bundle width LC means that magnetic path length LM may be reduced. As a result, the flux rise time of the recording head, the nonlinear transition shift (NLTS) characteristic, the overwrite characteristic and so on are improved. A reduction in magnetic path length LM allows a reduction in size of the thin-film magnetic head itself as well. In addition, the number of layers of the thin-film coil may be reduced as long as the number of turns of the coil and coil bundle width LC are constant. Apex angle θ is thereby reduced. As a result, an increase in the effective track width due to an expansion of the magnetic flux is prevented during writing in a narrow track.

In the embodiment the second coil 14a reaches not only the helical groove of the first coil 12a covered with the insulating film 13 but also part of the helical plateau (turns), and the cross section of the second coil 14a is T-shaped. As a result, the cross-sectional area is increased and consequently, not only the electrical resistance of the second coil 14a but also the electrical resistance of the thin-film coil as a whole made up of the coils 12a and 14a is further reduced.

In the embodiment, as described with reference to FIG. 14A and FIG. 14B, the space between the turns of the first coil 12a may be increased. Consequently, processing of the photoresist pattern used for the selective plating is easily performed. In addition, the ratio of the resist width to the resist height of the photoresist pattern may be increased. As a result, there is little chance that the photoresist pattern collapses in the electrolyte. Furthermore, since the space between the turns of the first coil 12a may be increased, the ion beam application angle may be relatively increased when the seed layer between the turns is removed by ion milling after the layer formation by electroplating. As a result, there is little chance that part of the seed layer obstructed by the turns of the coil remains unremoved. Redeposition of the seed material scattered by ion milling is suppressed as well. A short circuit of the turns of the first coil 12a is thereby prevented.

Figure 5:
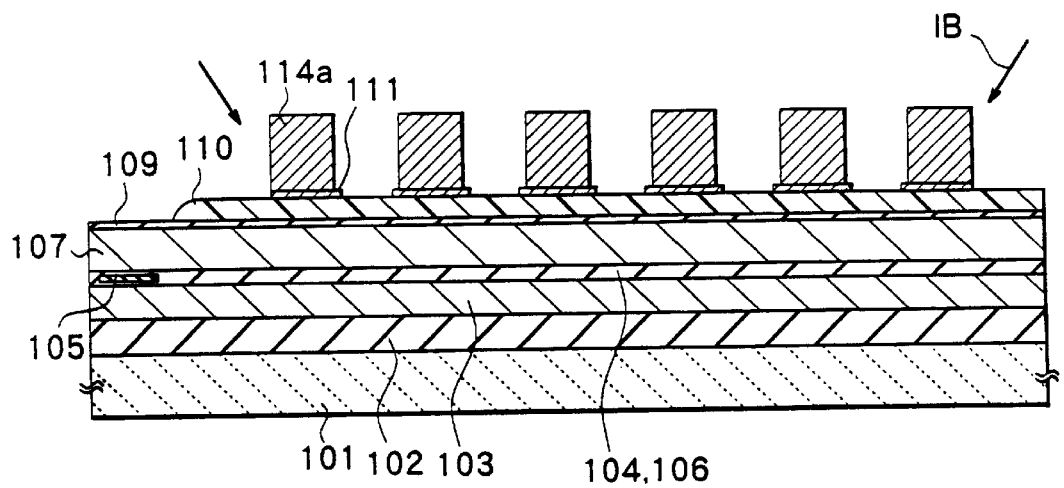
FIG. 5 is a cross section for illustrating a step that follows FIG. 4.
Figure 6:
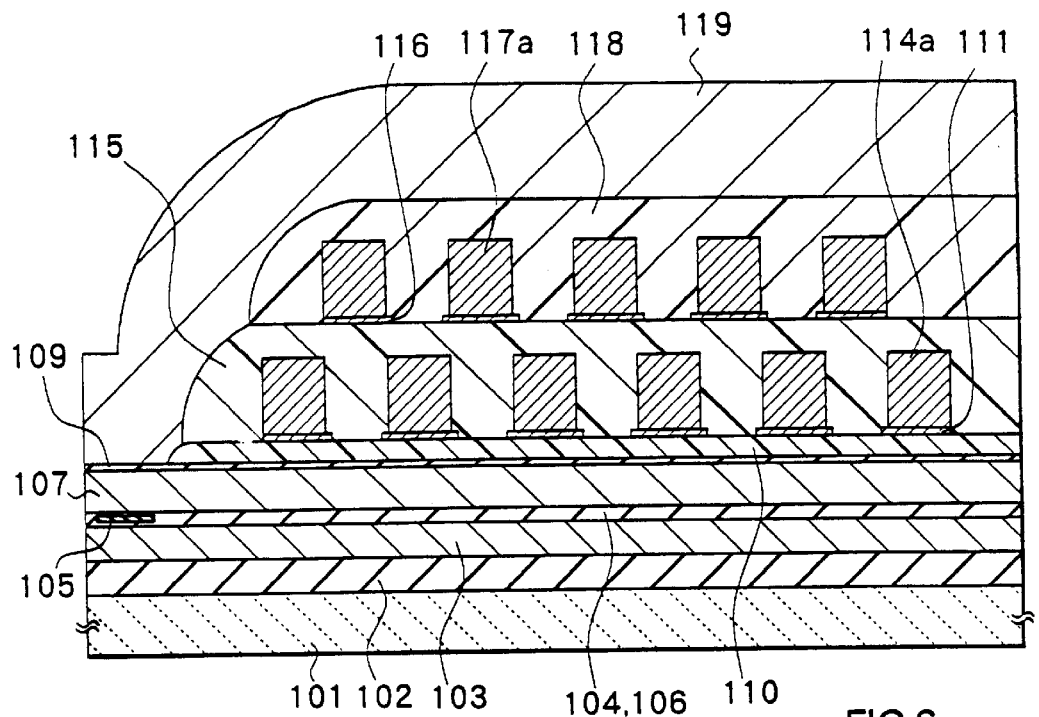
FIG. 6 is a cross section for illustrating a step that follows FIG. 5.

In the thin-film magnetic head of related art shown in FIG. 7, the photoresist 110 defining throat height TH is etched when the seed layer 111 is removed by etching as shown in FIG. 5. As a result, the front end of the photoresist 110 (the left end in FIG. 5) retreats and it is impossible to obtain the throat height in the complete thin-film magnetic head that precisely meets the designed value.

In the embodiment of the invention, in contrast, the insulating layer 8 that defines the throat height is made of inorganic insulator. Consequently, no pattern shift of the end of the insulating layer 8 results during etching of the seed layer 11 shown in FIG. 15A. Precise control of the throat height is therefore achieved. Precise control of the MR height and the apex angle is achieved as well.

The embodiment of the invention thus achieves manufacturing of the high-performance thin-film magnetic head whose magnetic pole width, throat height, MR height and apex angle are precisely controlled and which achieves a narrow track.

Figure 23:
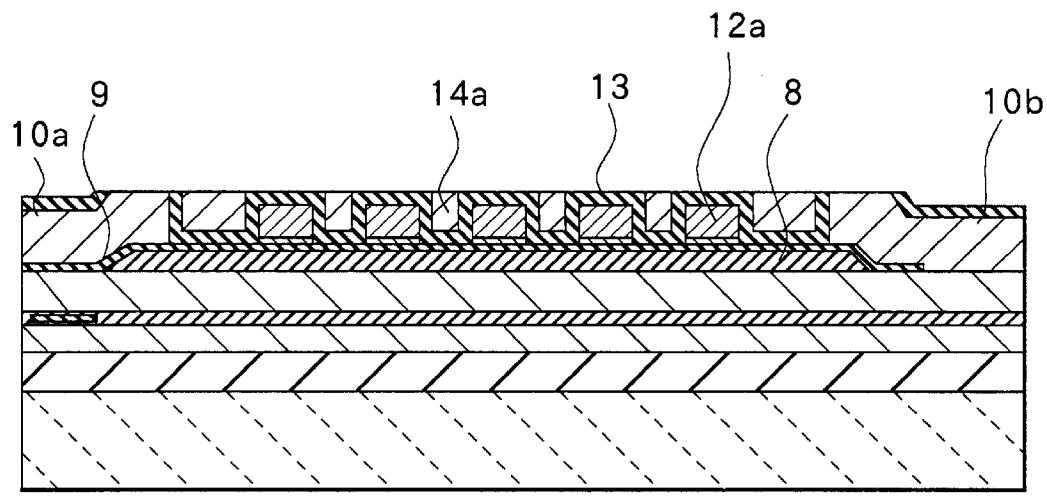
FIG. 23 is a cross sections for illustrating a manufacturing step of a thin-film magnetic head of a modification example of the embodiment of the invention.
Figure 24:
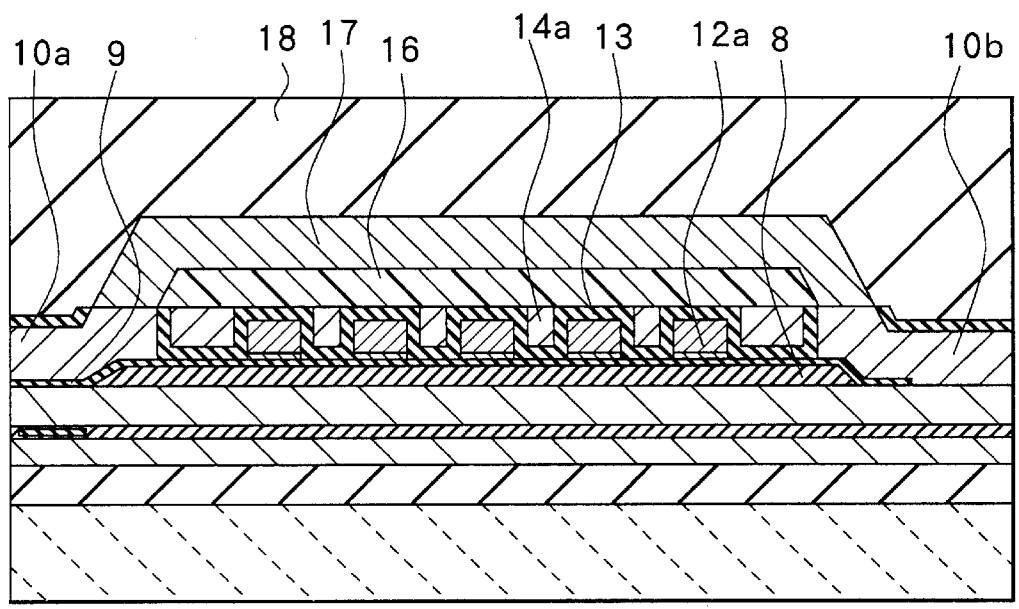
FIG. 24 is a cross sections of the thin-film magnetic head of the modification example of the embodiment of the invention.

In the embodiment, as shown in FIG. 17A, a slight portion of the conductive layer 14 is left above the first coil 12a when the conductive layer 14 and so on are ground by CMP. Selective etching is then performed, using photolithography so that the second coil 14a reaches not only the helical groove of the first coil 12a covered with the insulating film 13 but also part of the helical plateau (turns), and the cross section of the second coil 14a is T-shaped. The shape of the second coil 14a is not limited to the T-shaped cross section but may be formed as shown in FIG. 23 and FIG. 24. FIG. 23 shows a modification example of the step that follows the step shown in FIG. 16A. FIG. 24 shows the step that follows FIG. 23 and corresponds to FIG. 20A. In the modification example, as shown in FIG. 23, the conductive layer 14 is not left above the first coil 12a during grinding by CMP. That is, the turns of the first coil 12a are separated from one another only in the grinding step by CMP. Then, as shown in FIG. 24, the photoresist layer 16 and the top pole 17 are selectively formed in turn. The overcoat layer 18 is further formed over the whole surface. The method does not require forming of the photoresist pattern 15 and etching of the conductive layer 14 with the photoresist pattern 15 as a mask, each performed in the steps shown in FIG. 17A and FIG. 18A. Accordingly, the manufacturing steps are further simplified.

Figure 25:
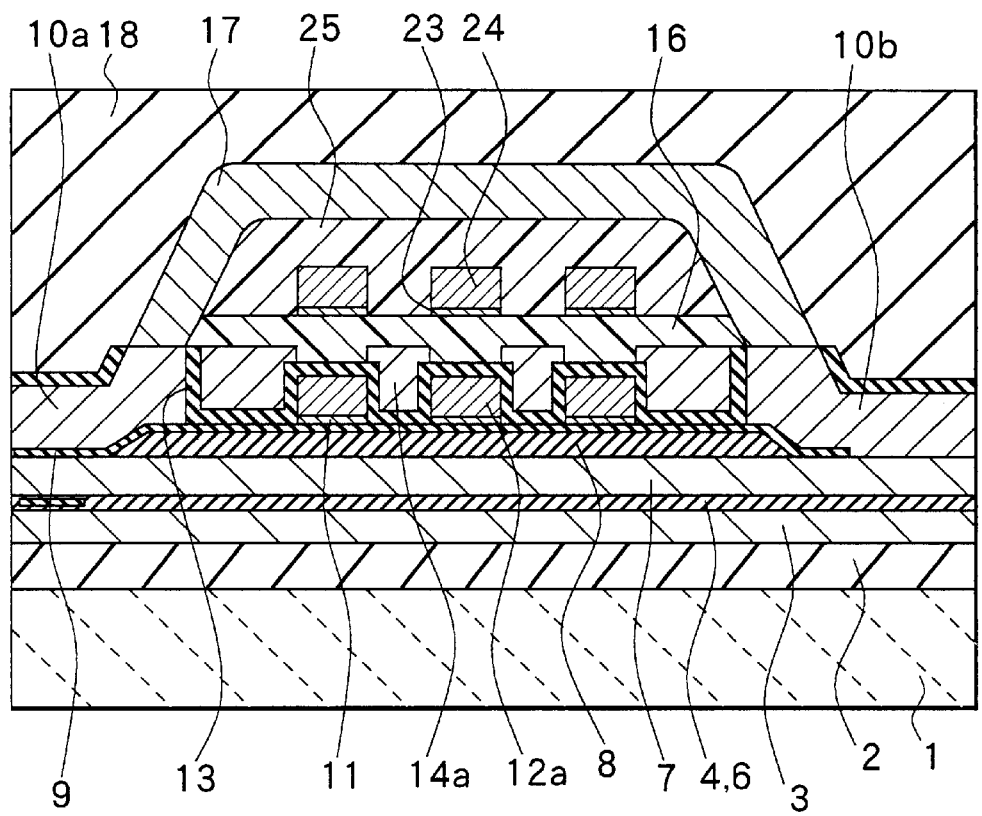
FIG. 25 is a cross sections of a thin-film magnetic head of another modification example of the embodiment of the invention.

In the embodiment, as shown in FIG. 20A, the first coil 12a and the second coil 14a are only fabricated as the thin-film coil and the coils are connected to each other with the linear relay lead 21 selectively formed in another layer as shown in FIG. 22. Instead of the relay lead 21, a third coil may be formed in another layer and the first coil 12a and the second coil 14a are connected to each other in series with the third coil. That is, as shown in FIG. 25, the photoresist layer 16 is formed to cover the first coil 12a and the second coil 14a. A seed layer 23 is then formed on the photoresist layer 16. A coil element is formed on the seed layer 23 by selective electroplating. The seed layer 23 between the turns of the coil element is then removed to form a third coil 24. The steps that follows are similar to those of the foregoing embodiment. That is, a photoresist layer 25 is selectively formed to cover the third coil 24. The top pole 17 is then selectively formed on the photoresist layer 25. The overcoat layer 18 is further formed over the whole surface. The third coil 14 corresponds to a 'third thin-film coil' of the invention.

Figures 26A, 26B:
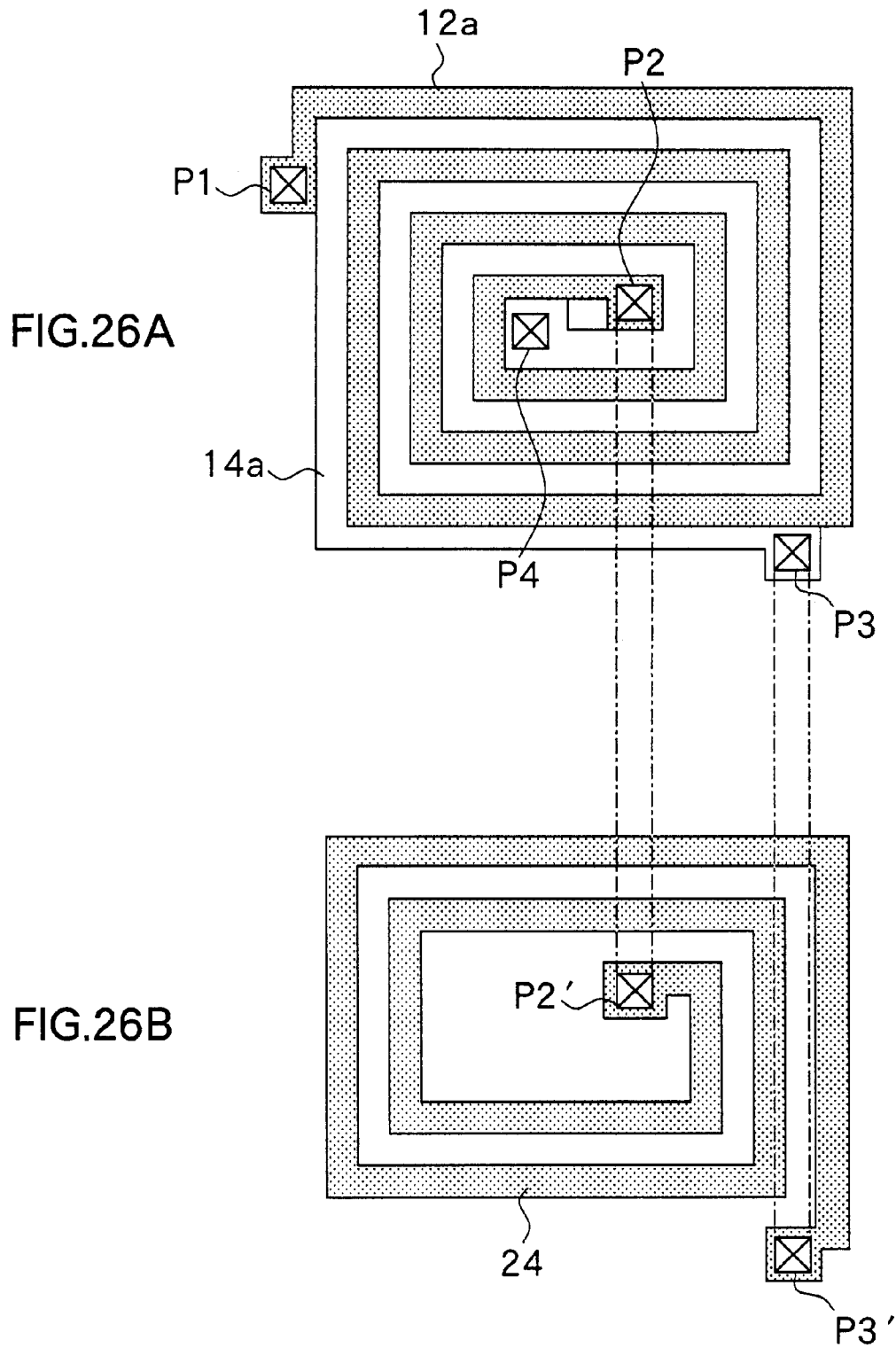
FIG. 26A and FIG. 26B are schematic top views for illustrating the first to third coils of the thin-film magnetic head shown in FIG. 25 and the manner in which the coils are connected.

In the modification example shown in FIG. 25, as shown in FIG. 26A and FIG. 26 B, the contact pad P2 at the inner end of the first coil 12a and a contact pad P2' at the inner end of the third coil 24 are connected to each other. A contact pad P3' at the outer end of the third coil 24 and the contact pad P3 at the outer end of the second coil 14a are connected to each other. The contact pad P1 at the outer end of the first coil 12a and the contact pad P4 at the inner end of the second coil 14a are each connected to first and second external terminals not shown, respectively. FIG. 26A is a schematic line drawing illustrating the direction of turning of the first coil 12a and the second coil 14a and the state of connection. FIG. 26B is a schematic line drawing illustrating the direction of turning of the third coil 24. As shown, the first coil 12a and the second coil 14a are connected in series with the third coil 14 that functions as a relay lead as well. The directions of turning of the coils are all right-handed. As a result, an application of voltage across the first and second external terminals allows a current to flow through the first coil 12a, the third coil 14a and the second coil 24 in the same direction of turning. To be specific, a current passes in the order of P1, P2, P2', P3', P3 and P4, or in the reverse order. Therefore, the number of turns of the thin-film coil may be further increased, compared to the foregoing embodiment, as long as coil bundle width LC is equal. In other words, coil bundle width LC may be further reduced as long as the number of turns of the thin-film coil is equal. Although the contact pad P2 at the inner end of the first coil 12a and the contact pad P3 at the outer end of the second coil 14a are connected to each other with the third coil 24 in the example shown in FIG. 26A and FIG. 26B, the contact pad P1 at the outer end of the first coil 12a and the contact pad P4 at the inner end of the second coil 14a may be connected to each other with third coil 24 as well. In this case, the contact pads P2 and P3 are each connected to the first and second external terminals, respectively.

Figure 27:
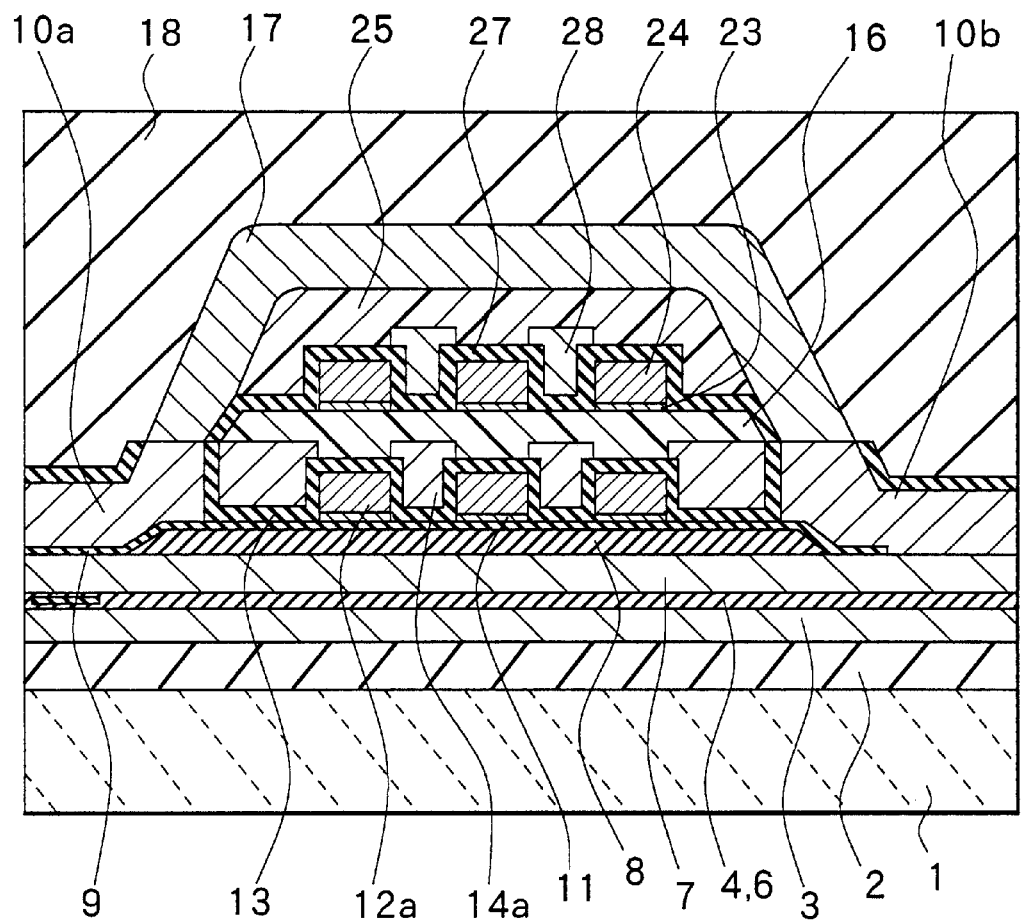
FIG. 27 is a cross sections of a thin-film magnetic head of still another modification example of the embodiment of the invention.

As shown in FIG. 27, a fourth coil may be further fabricated besides the third coil. The fourth coil may be formed in the steps similar to those of formation of the second coil 14a. That is, an insulating layer 27 is formed to cover the third coil 24. A conductive layer is then formed on the insulating layer 27 by MO-CVD. The conductive layer is selectively etched by photolithography to form a fourth coil 28 embedded in a helical groove of the third coil 24 covered with the insulating layer 27. In this case, too, the fourth coil 28 may reach top of the helical plateau (turns) and may have a T-shaped cross section as the second coil 14a. In FIG. 27 the photoresist layer 16 corresponds to an 'interlayer insulator' of the invention.

Figures 28A, 28B:
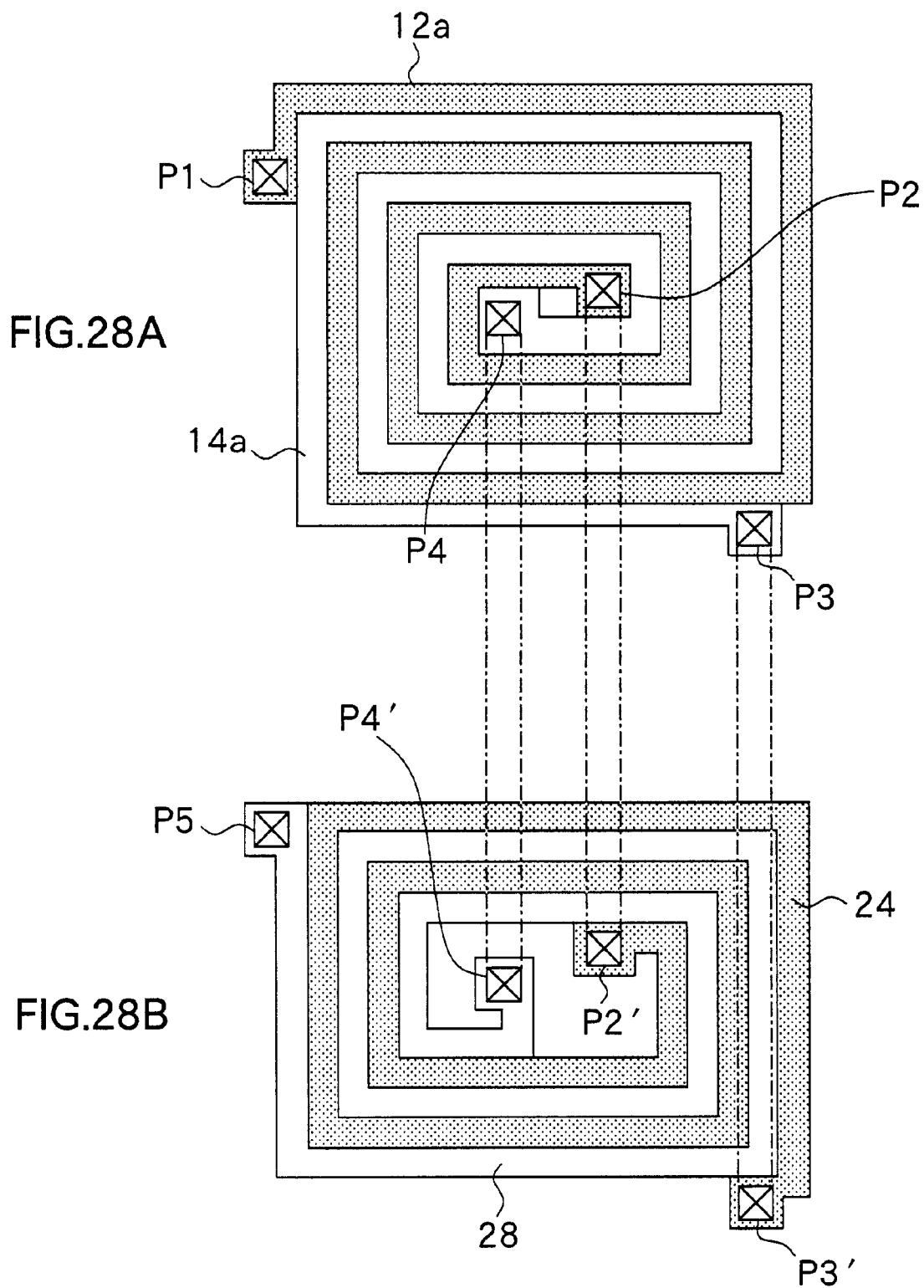
FIG. 28A and FIG. 28B are schematic top views for illustrating the first to fourth coils of the thin-film magnetic head shown in FIG. 27 and the manner in which the coils are connected.

In the modification example shown in FIG. 27, as shown in FIG. 28A and FIG. 28B, the contact pad P4 at the inner end of the second coil 14a is connected to a contact pad P4 at the inner end of the fourth coil 28. A contact pad P5 at the outer end of the fourth coil 28 is connected to the second external terminal not shown. The other connections are similar to the example shown in FIG. 26A and FIG. 26B. FIG. 28A is a schematic line drawing illustrating the direction of turning of the first coil 12a and the second coil 14a and the state of connection. FIG. 28B is a schematic line drawing illustrating the direction of turning of the third coil 24 and the fourth coil 28 and the state of connection. As shown, the first coil 12a, the third coil 24, the second coil 14a and the fourth coil 28 are connected in series in this order. The directions of turning of the coils are all right-handed. As a result, an application of voltage across the first and second external terminals allows a current to flow through the coils in the same direction of turning. To be specific, a current passes in the order of P1, P2, P2', P3', P3, P4, P4 and P5, or in the reverse order. Therefore, the number of turns of the thin-film coil may be further increased, compared to the foregoing modification examples (FIG. 25, FIG. 26A and FIG. 26B), as long as coil bundle width LC is equal. In other words, coil bundle width LC may be further reduced as long as the number of turns of the thin-film coil is equal.

FIG. 29A and FIG. 29B illustrate the magnetic path length of the thin-film magnetic head of related art and the magnetic path length of the thin-film magnetic head of the embodiment of the invention, compared to each other. FIG. 29A is a top view of the thin-film magnetic head of related art. FIG. 29B is a top view of the thin-film magnetic head of the embodiment of the invention. The thin-film magnetic heads each have a two-layer structure as shown in FIG. 7 and FIG. 27. Both magnetic heads are nearly equal in space between the turns of the coil and in number of turns. In the magnetic head of the embodiment of the invention, turn pitch CP of the thin-film coil including all the turns of the two layers is reduced to half of that of the related-art thin-film magnetic head. Consequently, magnetic path length LM2 of the thin-film magnetic head of the embodiment of the invention (FIG. 29B) is reduced to about two thirds of magnetic path length LM1 of the thin-film magnetic head of related art (FIG. 29A). As a result, the characteristics of the thin-film magnetic head of the embodiment of the invention such as the flux rise time, NLTS and overwrite are much improved, compared to the related-art thin-film magnetic head.

Figure 30:
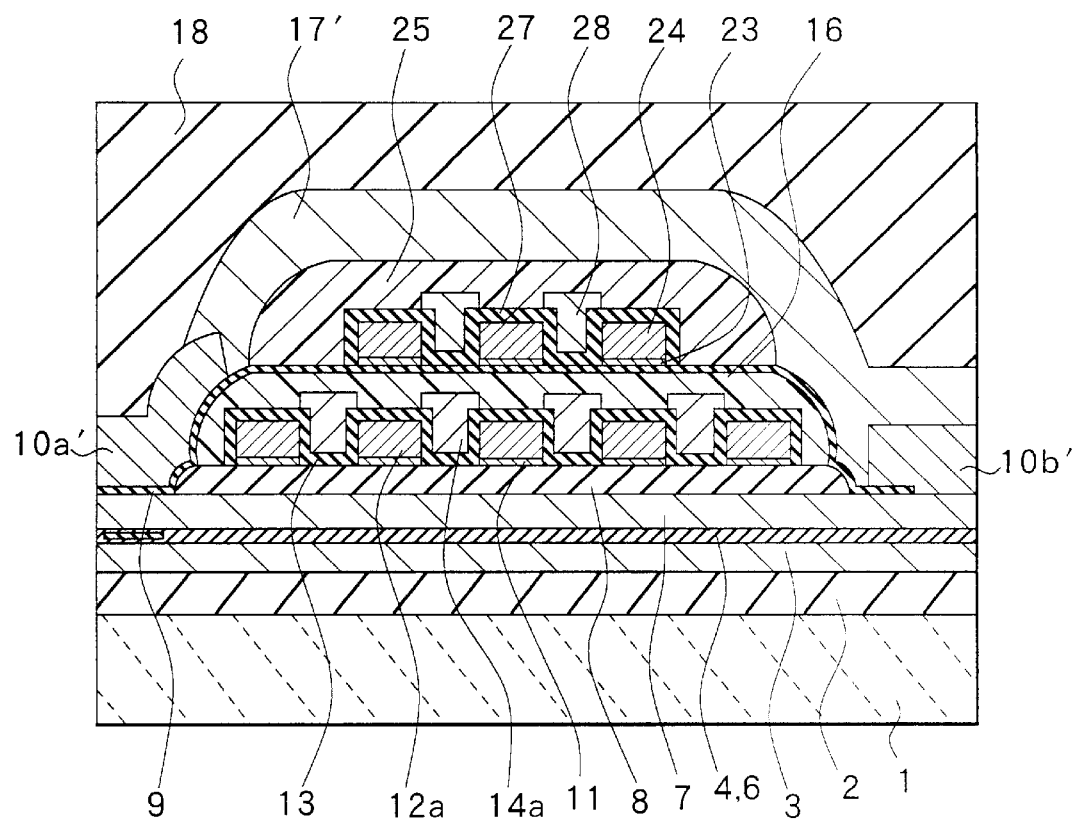
FIG. 30 is a cross sections of a thin-film magnetic head of still another modification example of the embodiment of the invention.

In the embodiment and the modification examples of the invention, as shown in FIG. 27, for example, the top pole tip 10a and the top pole 17 making up the top magnetic layer are coupled to each other whose interface is the plane nearly parallel to the substrate surface. Alternatively, as shown in FIG. 30, for example, not only the top face of a top pole tip 10a' but also the end face thereof is brought to contact with a top pole 17' such that the top pole tip 10a' is held into the top pole 17'. Such a structure allows the contact surface between the top pole tip 10a' and the top pole 17' to be increased. As a result, saturation of the magnetic flux in the contact part is suppressed. Such an effect is particularly remarkable when the width of the top pole tip 10a (that is, magnetic pole width P2W) is reduced to 1 μm or below, for example. The overwrite characteristic is thereby improved. In FIG. 30 like numerals are assigned to the components similar to those shown in FIG. 27. In the example shown in FIG. 30, the recording gap layer 9 is formed after formation of the photoresist layer 16. The recording gap layer 9 is placed between the thin-film coil of the first layer and the thin-film coil of the second layer.

Figure 31:
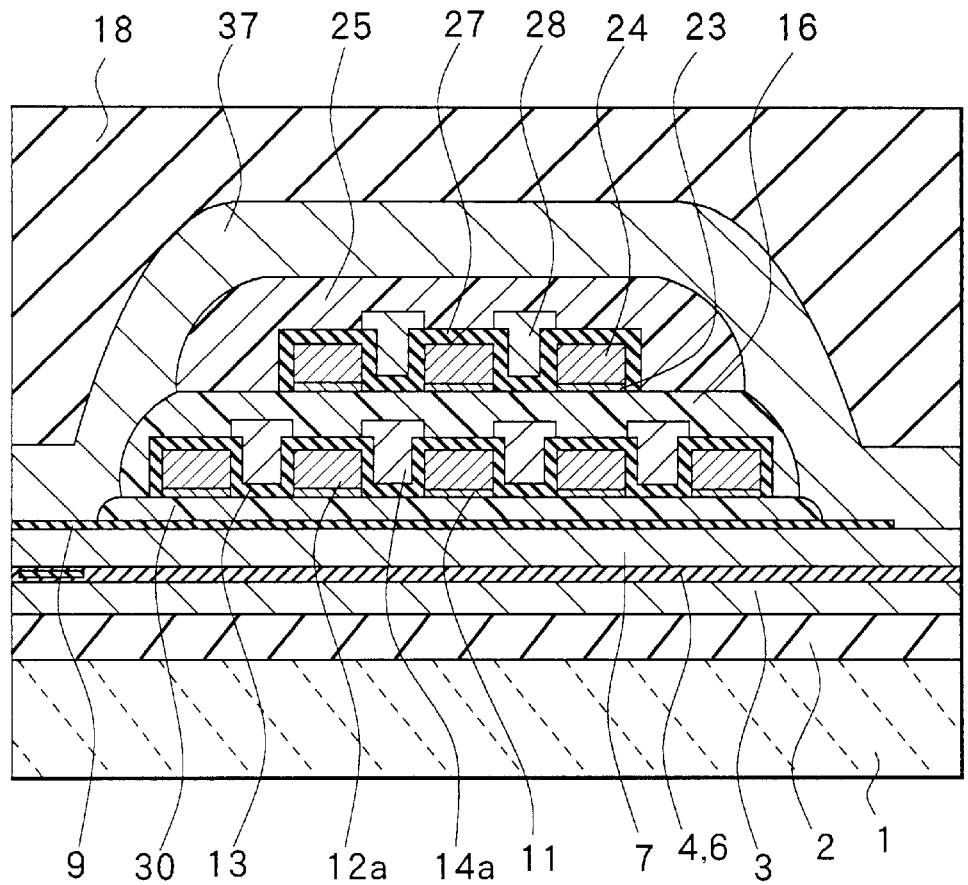
FIG. 31 is a cross sections of a thin-film magnetic head of still another modification example of the embodiment of the invention.
Figure 37A:
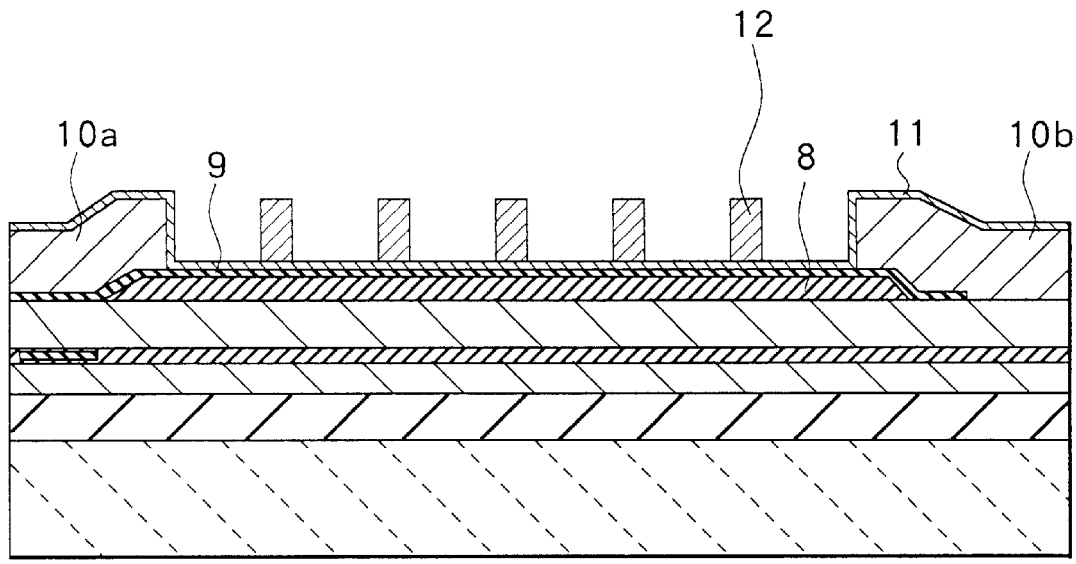
FIG. 37A and FIG. 37B are cross sections for illustrating a step that follows FIG. 36A and FIG. 36B.
Figure 37B:
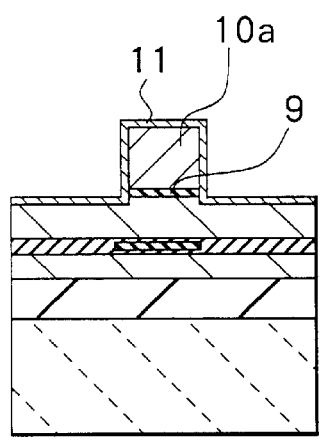
Figure 38A:
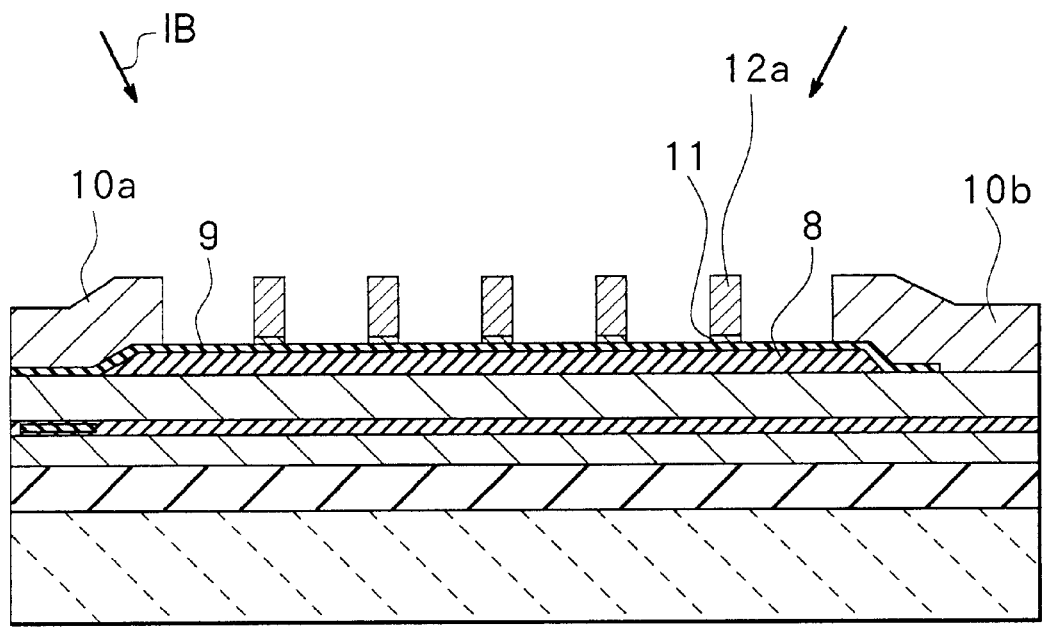
FIG. 38A and FIG. 38B are cross sections for illustrating a step that follows FIG. 37A and FIG. 37B.
Figure 38B:
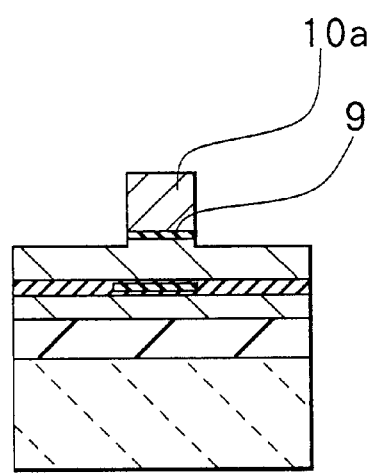

In the embodiment and the modification examples of the invention, as shown in FIG. 27, for example, the top pole, facing the bottom pole 7 with the recording gap layer 9 in between, is divided into the top pole 17 and the top pole tip 10a. The invention is not limited to such a configuration but the top pole may be an integral one. In this case, as shown in FIG. 31, for example, the photoresist layer 25 is formed and then an integral top pole 37 is selectively formed instead of the top pole 17 and the top pole tip 10a. In FIG. 31 like numerals are assigned to the components similar to those shown in FIG. 27. In the example shown in FIG. 31, a photoresist layer 30 is formed as an insulating layer beneath the thin-film coil instead of the insulating layer 8 made of an inorganic material shown in FIG. 27. The recording gap layer 9 is formed before formation of the photoresist layer 30.

[Second Embodiment]

A second embodiment of the invention will now be described in detail with reference to the accompanying drawings.

FIG. 32A and FIG. 32B to FIG. 45A and FIG. 45B illustrate manufacturing steps of a composite thin-film magnetic head as a method of manufacturing a thin-film magnetic head of the second embodiment of the invention. FIG. 32A to FIG. 45A are cross sections each orthogonal to an air bearing surface. FIG. 32B to FIG. 45B are cross sections each parallel to a pole portion of the air bearing surface. Like numerals are assigned to components similar to those shown in the drawings accompanying the description of the foregoing first embodiment and description thereof is omitted. A thin-film magnetic head of the second embodiment of the invention implemented through the method of manufacturing a thin-film magnetic head of the embodiment will be described as well.

In the manufacturing method of the embodiment, the steps shown in FIG. 32A and FIG. 32B to FIG. 38A and FIG. 38B are similar to those shown in FIG. 9A and FIG. 9B to FIG. 15A and FIG. 15B and description thereof is omitted. However, in the second embodiment, for convenience of description, the thickness of the top pole tips 10a and 10b is shown thinner in FIG. 36A and FIG. 36B. The width of the coil element 12 is shown narrower and the space between the turns is shown wider in FIG. 37A, FIG. 37B, FIG. 38A and FIG. 38B.

Figure 39A:
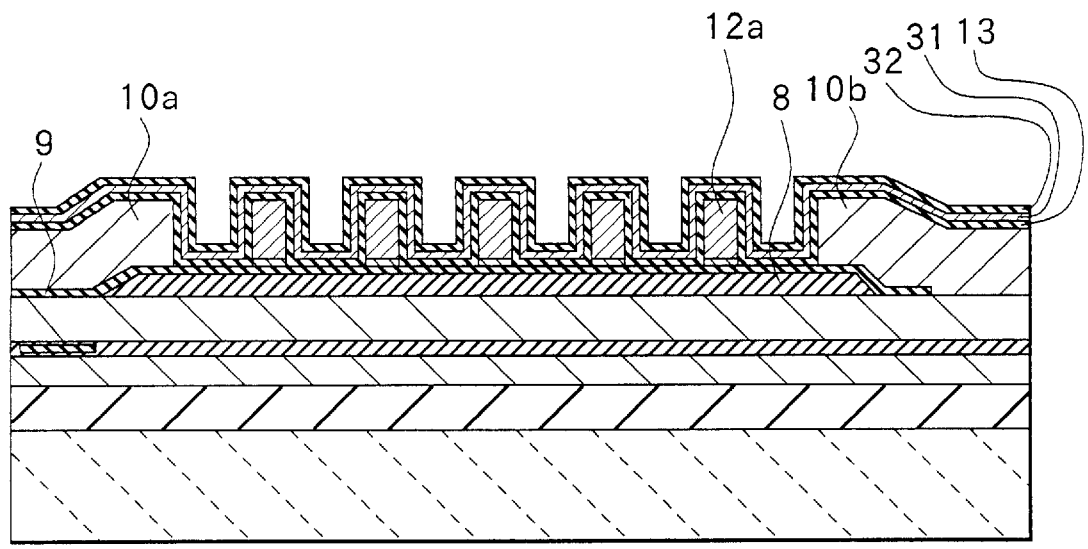
FIG. 39A and FIG. 39B are cross sections for illustrating a step that follows FIG. 38A and FIG. 38B.
Figure 39B:
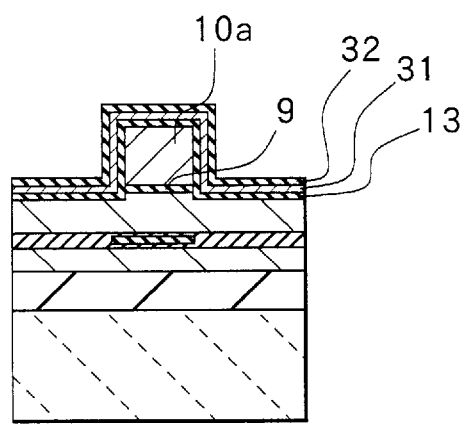

In the second embodiment, the first coil 12a is formed and then, as shown in FIG. 39A and FIG. 39B, the insulating film 13 of alumina, for example, whose thickness is about 300 to 500 nm is formed over the whole surface along the projections and depressions of the first coil 12a to cover the first coil 12a. A thin seed layer 31 made of copper, for example, of about 50 to 70 nm in thickness is further formed over the whole surface to cover the insulating film 13 by sputtering and so on. The insulating film 13 may be made of an inorganic insulator such as silicon dioxide, alumina nitride and so on. The insulating film 13 isolates the first coil 12a and the second coil 14a described below from each other and corresponds to the 'insulating film' of the invention. The seed layer 31 corresponds to a 'conductive film' of the invention.

Next, as shown in FIG. 39A and FIG. 39B, an insulating film 32 of alumina, for example, whose thickness is about 100 to 300 nm is formed to cover the seed layer 31. The insulating film 32 may be made of an inorganic material such as silicon dioxide or alumina nitride, or an organic material such as photoresist.

Figure 40A:
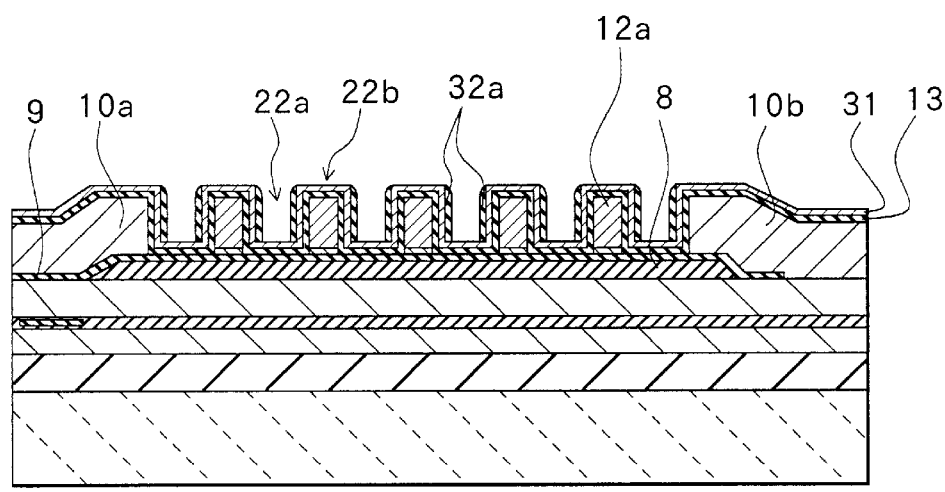
FIG. 40A and FIG. 40B are cross sections for illustrating a step that follows FIG. 39A and FIG. 39B.
Figure 40B:
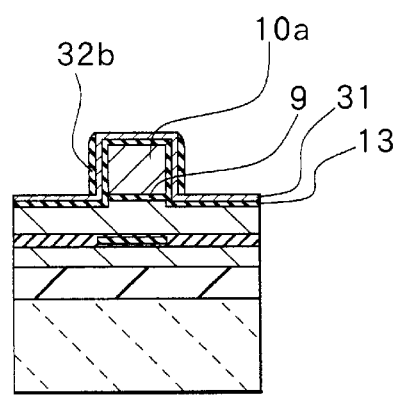

Next, as shown in FIG. 40A and FIG. 40B, the insulating film 32 is etched through anisotropic etching such as RIE to form an insulator sidewalls 32a on the sides of the helical groove 22a covered with the seed layer 31. The insulating film 32 is removed at the bottom of the helical groove 22a and on the helical plateau 22b and the seed layer 31 is exposed. As shown in FIG. 40B, insulator sidewalls 32b are formed on the sides of the trim structure made up of the top pole tip 10a, the recording gap layer 9 and part of the bottom pole 7 as well with the seed layer 31 in between.

Figure 41A:
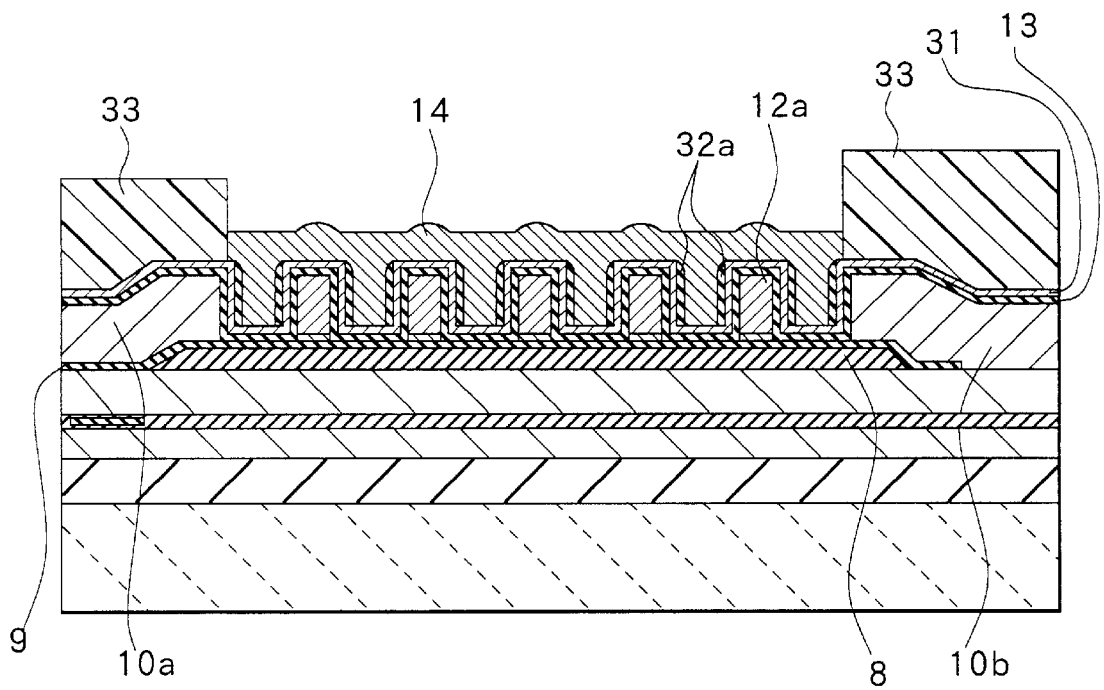
FIG. 41A and FIG. 41B are cross sections for illustrating a step that follows FIG. 40A and FIG. 40B.
Figure 41B:
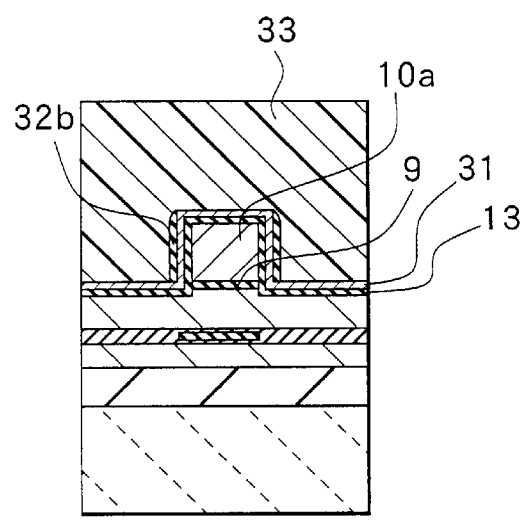

Next, as shown in FIG. 41A and FIG. 41B, a photoresist layer 33 is selectively formed in the region other than the region where the first coil 12a is formed. With the photoresist 33 as a mask, selective electroplating is performed in an electrolyte such as copper sulfate to have plating grow out of the seed layer 31. A plating layer 14 of copper whose thickness is about 2.0 to 3.0 μm is thereby formed in the region where the first coil 12a is formed. The insulator sidewalls 32a covering the sides of the helical groove 22a suppress plating growth from the seed layer 31 on the sides of the groove. Instead, plating growth from the seed layer 31 exposed at the bottom of the helical groove 22a is only allowed. As a result, generation of voids is suppressed inside the plating layer 14 that is embedded into the helical groove 22a. The helical groove 22a is completely filled with the plating layer 14. The insulator sidewalls 32a corresponds to an 'insulator sidewall' of the invention.

Figure 42A:
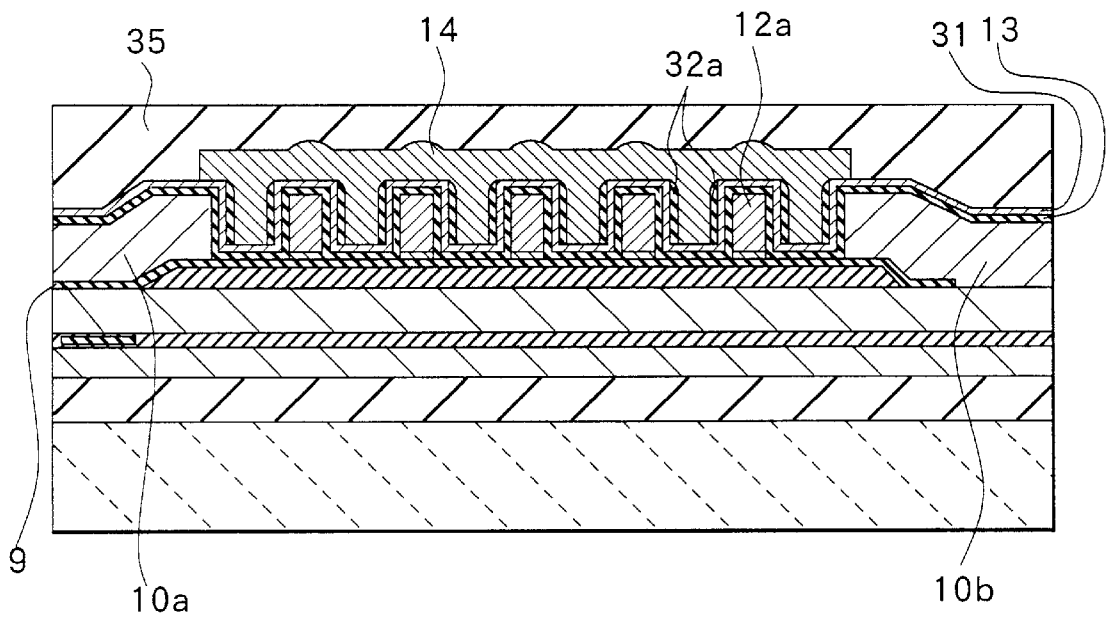
FIG. 42A and FIG. 42B are cross sections for illustrating a step that follows FIG. 41A and FIG. 41B.
Figure 42B:
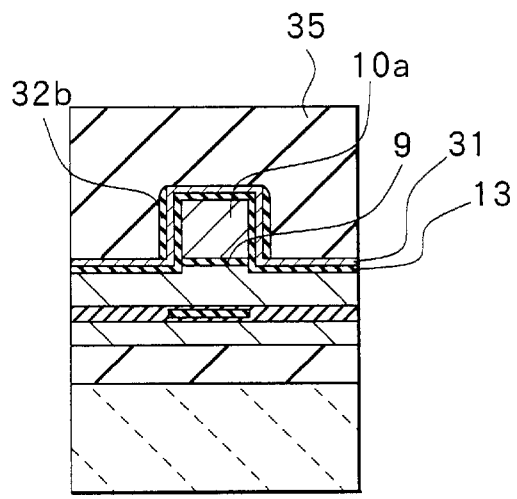

Next, as shown in FIG. 42A and FIG. 42B, an insulating layer 35 of alumina, for example, whose thickness is about 3.0 to 5.0 μm is formed over the whole surface to flatten the surface.

Figure 43A:
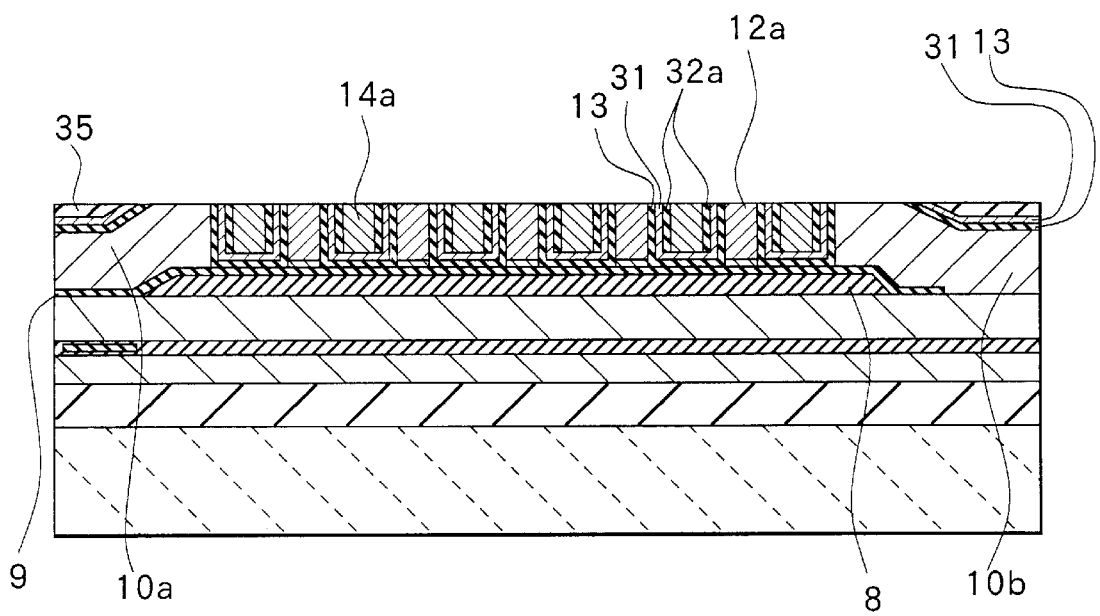
FIG. 43A and FIG. 43B are cross sections for illustrating a step that follows FIG. 42A and FIG. 42B.
Figure 43B:
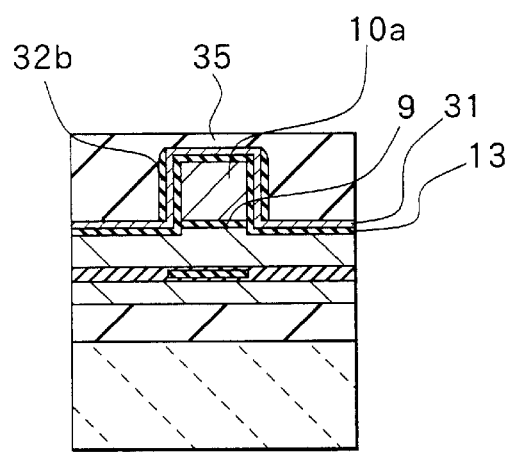

Next, as shown in FIG. 43A and FIG. 43B, the whole surface is ground by a specific amount through chemical mechanical polishing (CMP). The amount of grinding is such that the insulating film 13 and the seed layer 31 on the turns of the first coil 12a, and part of the insulating film 13 and the seed layer 31 on the top pole tips 10a and 10b are removed and the turns of the first coil 12a and part of top of the top pole tips 10a and 10b are exposed, as shown. As a result, the plating layer 14 is separated among the helical groove 22a of the first coil 12a, and the second coil 14a is thereby formed with which the helical groove 22a is filled. The second coil 14a is insulated from the first coil 12a with the insulating film 13. The second coil 14a corresponds to the 'second thin-film coil' of the invention.

Figure 44A:
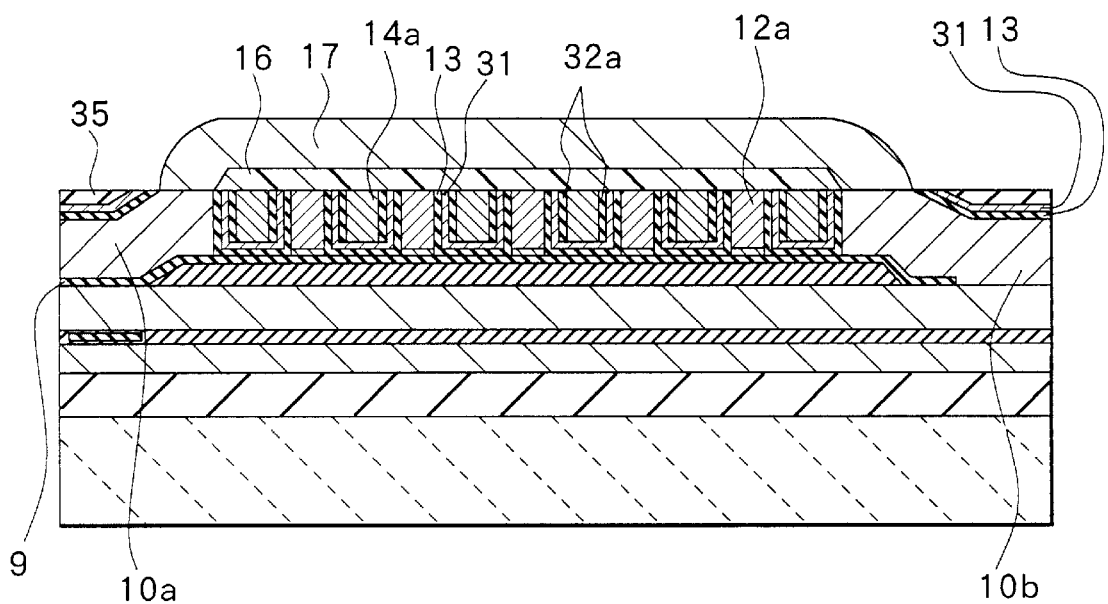
FIG. 44A and FIG. 44B are cross sections for illustrating a step that follows FIG. 43A and FIG. 43B.
Figure 44B:
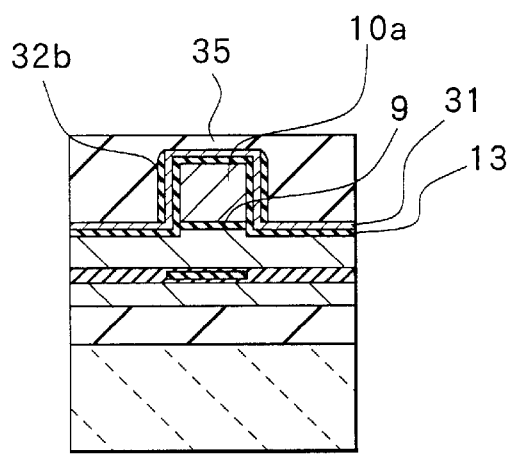

Next, as shown in FIG. 44A and FIG. 44B, the photoresist layer 16 of 2.0 to 3.0 μm in thickness is selectively formed by photolithography on the region of the thin-film coil including the first coil 12a and the second coil. On the photoresist layer 16, the top pole 17 of Permalloy, for example, of 3.0 to 4.0 μm in thickness is then selectively formed by plating, for example. The top pole 17 comes to contact with the top pole tip 10a to be magnetically coupled thereto in the front end region of the insulating layer 8. The top pole 17 comes to contact with the top pole tip 10b to be magnetically coupled thereto in the rear end region of the insulating layer 8. A magnetic path is thereby formed by the top pole tip 10a, the top pole 17, the top pole tip 10b and the bottom pole 7. The top pole tip 10a corresponds to the other of the 'two magnetic layers' of the invention. The top pole 17 corresponds to 'another magnetic layer' of the invention.

Figure 45A:
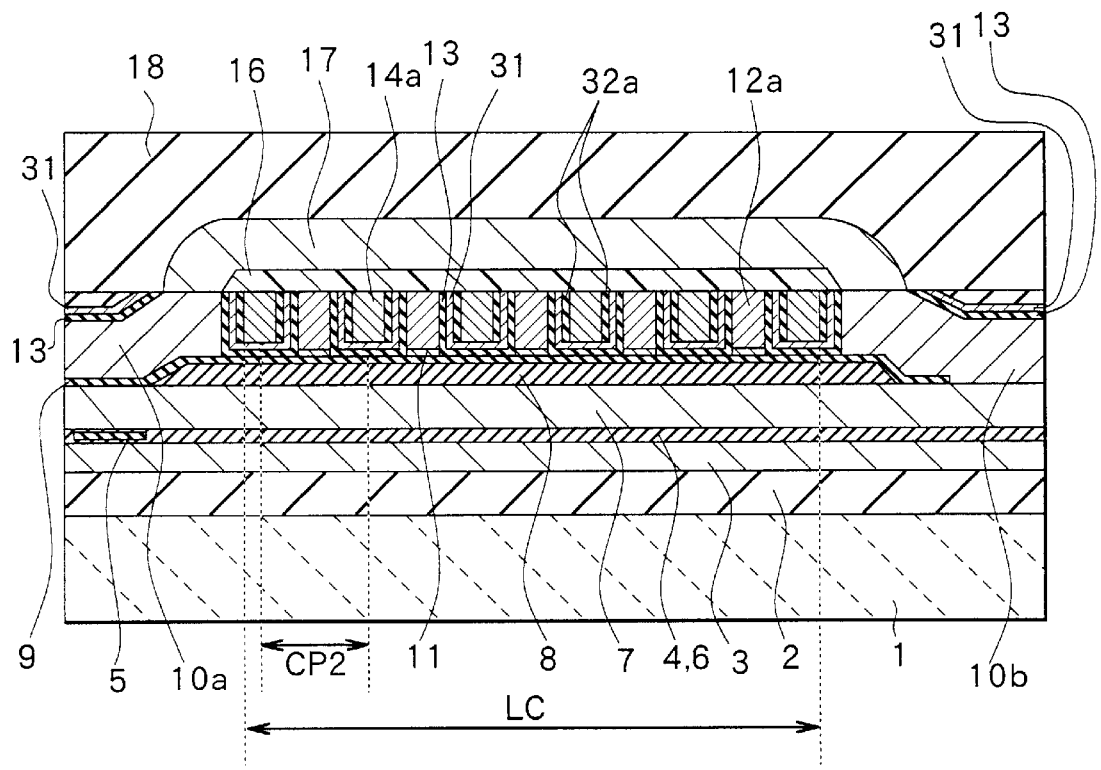
FIG. 45A and FIG. 45B are cross sections for illustrating a step that follows FIG. 44A and FIG. 44B.
Figure 45B:
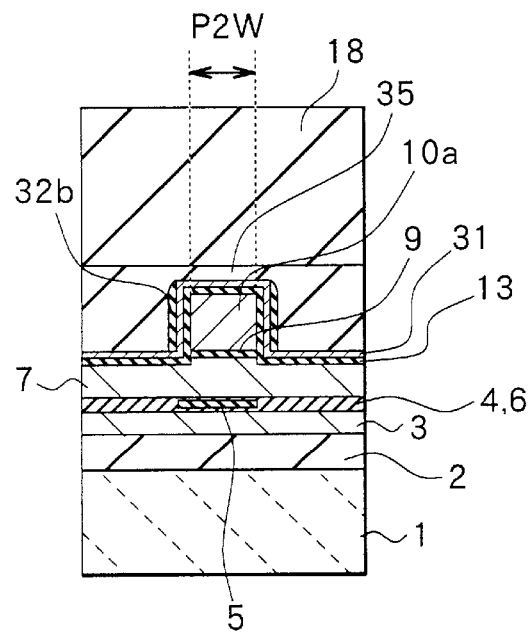

As shown in FIG. 45A and FIG. 45B, the overcoat layer 18 of alumina, for example, whose thickness is about 20 to 40 μm is formed to cover the whole surface. Finally, lapping of a slider is performed and the air bearing surface of the recording head and the reproducing head is formed. The composite thin-film magnetic head is thus completed.

The top structure of the composite thin-film magnetic head thus completed is similar to the one shown in FIG. 21 of the foregoing first embodiment of the invention and description thereof is omitted.

The direction of turning of the first coil 12a and the second coil 14a and the state of connection are similar to those shown in FIG. 22 and description thereof is omitted.

According to the embodiment of the invention described so far, when the plating layer 14 is formed in the helical groove 22a of the first coil 12a through plating growth, part of the seed layer 31 as the plating base formed in the helical groove 22a on the sides of the groove is covered with the insulator sidewalls 32a. As a result, plating growth from the sides of the groove is prevented and generation of voids is suppressed when the helical groove 22a is filled with the plating layer 14. The reliability of the magnetic head is thereby further increased.

The embodiment of the invention thus achieves manufacturing of the high-performance thin-film magnetic head offering high reliability whose magnetic pole width, throat height, MR height and apex angle are precisely controlled and which achieves a narrow track. The remainder of effects of the embodiment are similar to those of the foregoing first embodiment and description thereof is omitted.

Figure 46A:
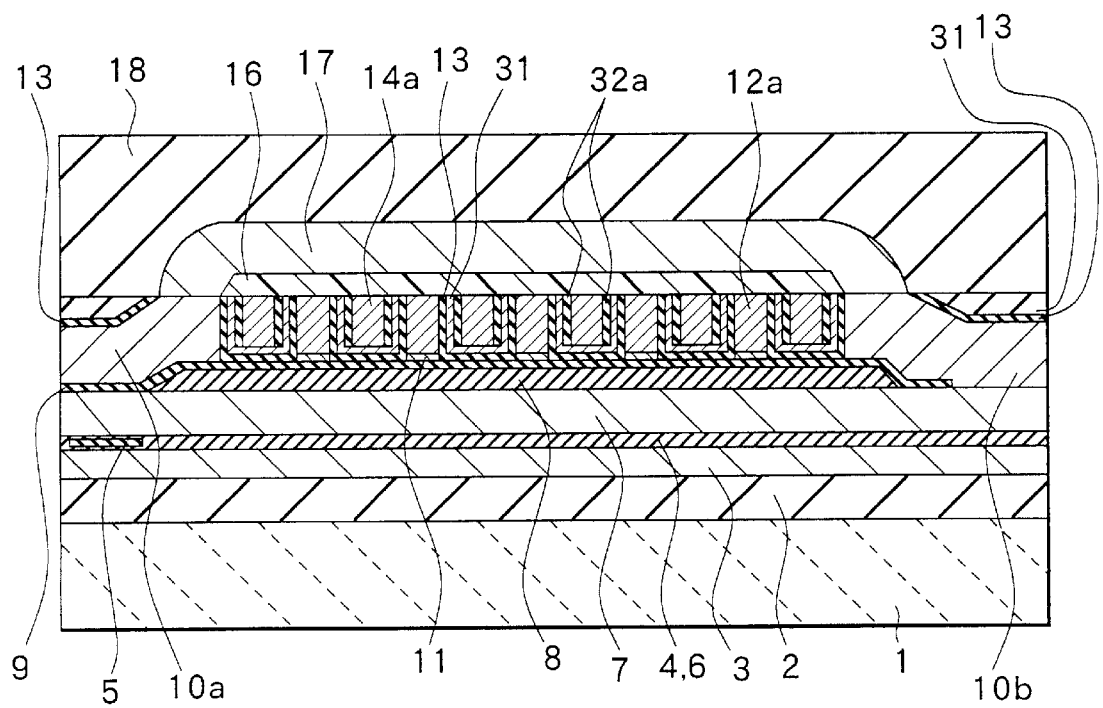
FIG. 46A and FIG. 46B are cross sections of a thin-film magnetic head of a modification example of the embodiment of the invention.
Figure 46B:
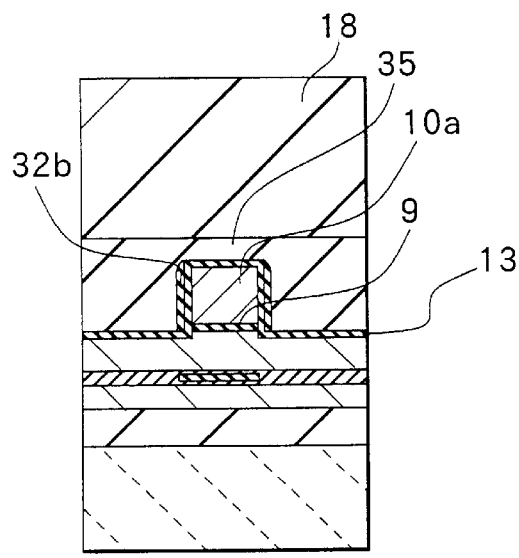

In the embodiment, as shown in FIG. 45A and FIG. 45B, the seed layer 31 remains on the top pole tips 10a and 10b. Alternatively, the seed layer 31 may be removed from the top pole tips 10a and 10b as shown in FIG. 46A and FIG. 46B. For this purpose, the seed layer 31 is formed, as shown in FIG. 39A and FIG. 39B, and the seed layer 31 on the top pole tips 10a and 10b is then selectively removed by photolithography. The insulator sidewalls 32a are then formed. Such fabrication eliminates a chance that the seed layer 31 is exposed to the surface to be lapped during the lapping process to form the air bearing surface and causes recesses of the air bearing surface.

Figure 47A:
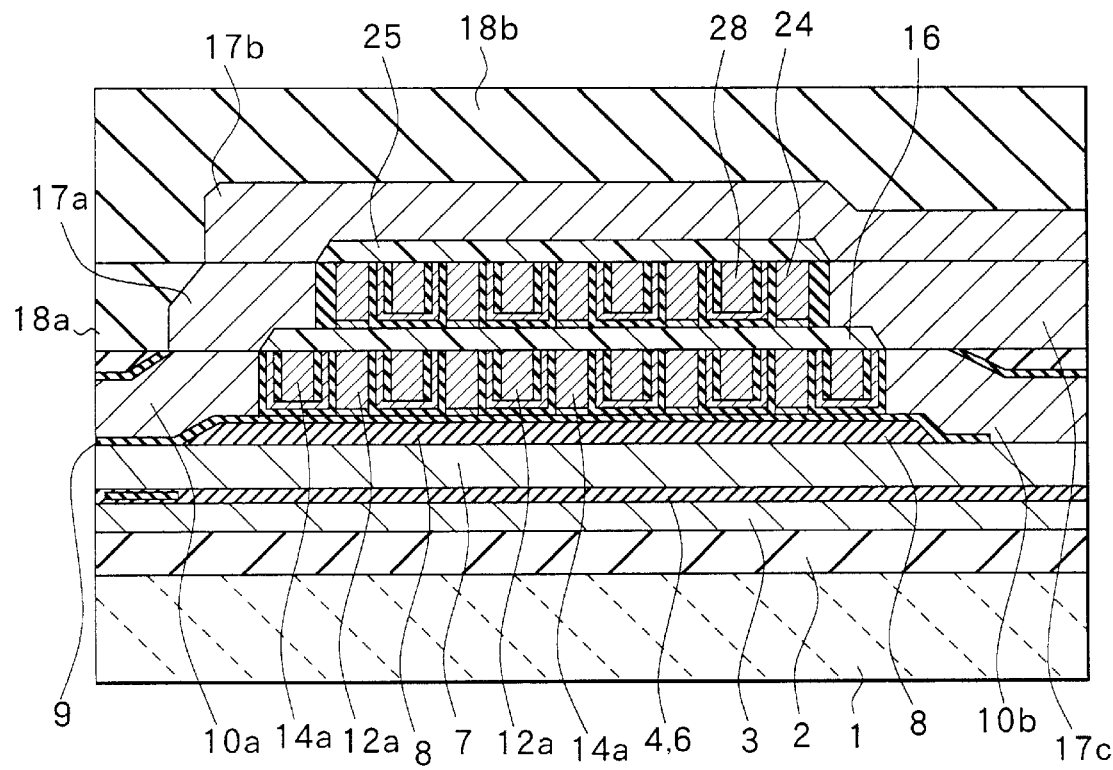
FIG. 47A and FIG. 47B are cross sections of a thin-film magnetic head of another modification example of the embodiment of the invention.
Figure 47B:
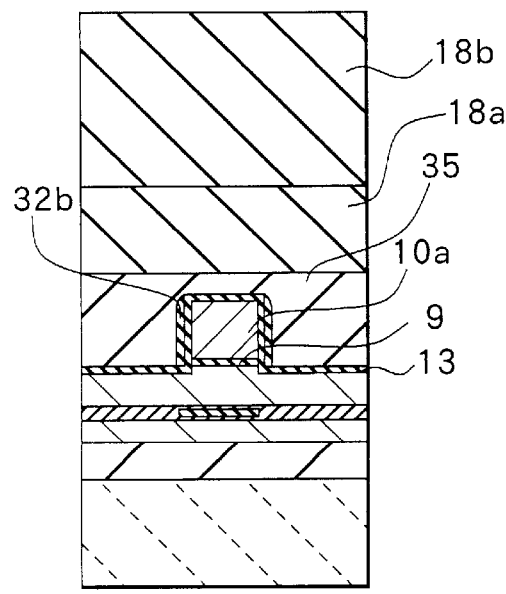

The invention is not limited to the embodiment wherein the single-layered thin-film coil made up of the first coil 12a and the second coil 14a is formed. As shown in FIG. 47A and FIG. 47B, for example, a thin-film coil of another layer made up of the third coil 24 and the fourth coil 28 may be formed. In this case, the steps of fabricating the third coil 24 and the fourth coil 28 are similar to the steps of fabricating the first coil 12a and the second coil 14a. The photoresist layer 16 is selectively formed on the thin-film coil of the first layer made up of the first coil 12a and the second coil 14a. On the photoresist layer 16, the third coil 24 and the fourth coil 28 making up the thin-film coil of the second layer are formed in turn. In front and behind the thin-film coil of the second layer, top pole tips 17a and 17c each magnetically coupled to the top pole tips 10a and 10b, respectively, are selectively formed. An insulating layer 18a is formed in the second layer on top of the top pole tip 10a. Next, the photoresist layer 25 is selectively formed to cover the thin-film coil of the second layer made up of the third coil 24 and the fourth coil 28. On the photoresist layer 25, the top pole 17 magnetically coupled to the top pole tips 17a and 17c is further formed. Finally, an overcoat layer 19b is formed. In FIG. 47A and FIG. 47B, the photoresist layer 16 corresponds to the 'interlayer insulator' of the invention.

In this modification example, the direction of turning of the first coil 12a, the second coil 14a, the third coil 24 and the fourth coil 28, and the state of connection are similar to those of the first embodiment shown in FIG. 28A and FIG. 28B and description thereof is omitted.

In comparison between the magnetic path length of the thin-film magnetic head of related art shown in FIG. 7 and the magnetic path length of the thin-film magnetic head of the foregoing modification example of the invention shown in FIG. 47A and FIG. 47B, magnetic path length LM2 of the thin-film magnetic head of the modification example (FIG. 29B) is reduced to about two thirds of magnetic path length LM1 of the thin-film magnetic head of related art (FIG. 29A), as in the foregoing first embodiment described with reference to FIG. 29A and FIG. 29B.

Figure 50:
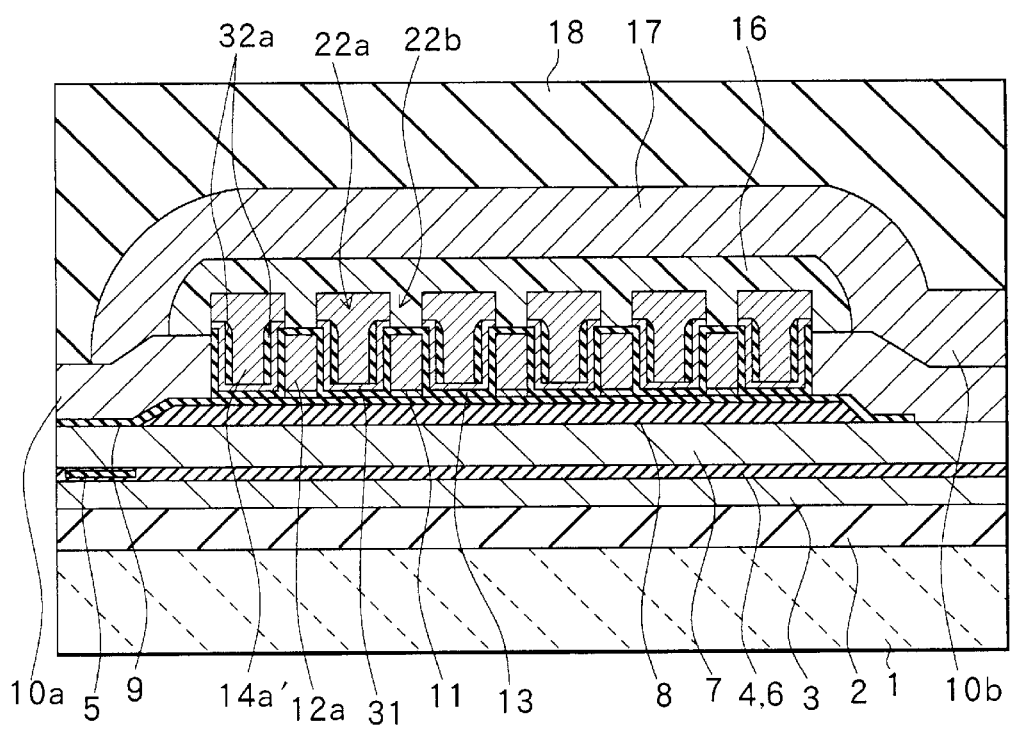
FIG. 50 is a cross sections for illustrating a step that follows FIG. 49.

In the foregoing embodiment shown in FIG. 45A and FIG. 45B, the second coil 14a is completely buried in the helical groove 22a of the second coil 14a and the groove 22a is completely filled with the second coil 14a. Alternatively, as shown in FIG. 50, the second coil 14a may reach not only the groove 22a but also part of top of the helical plateau 22b of the first coil 12a and may have a T-shaped cross section. The steps of manufacturing such a configuration may be as follows.

Figure 48:
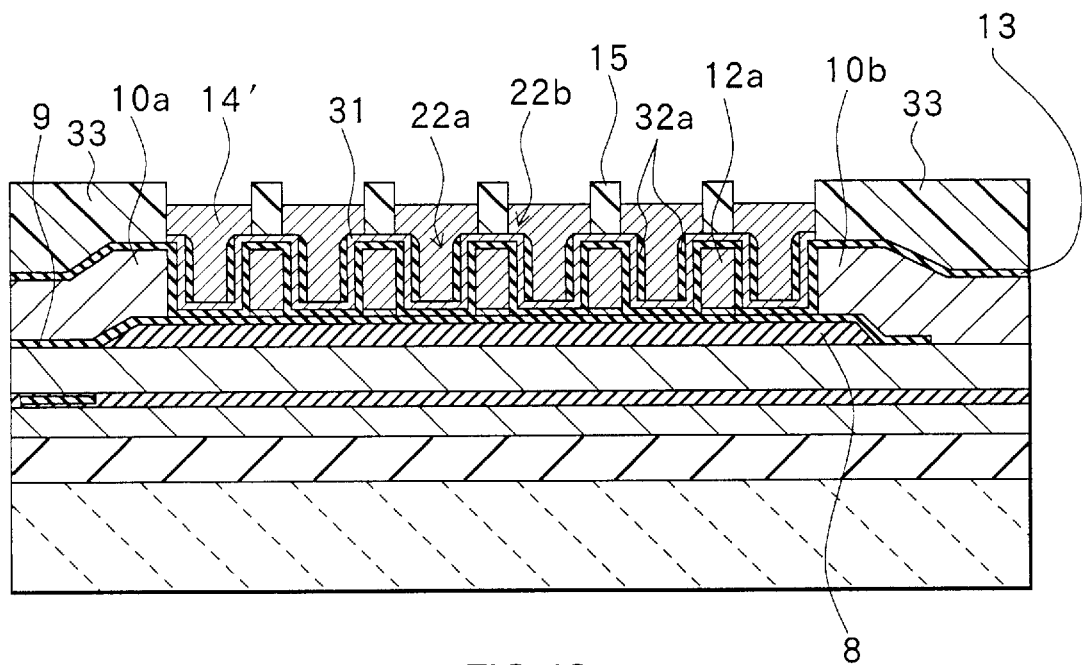
FIG. 48 is a cross sections for illustrating a manufacturing step of a thin-film magnetic head of still another modification example of the embodiment of the invention.
Figure 49:
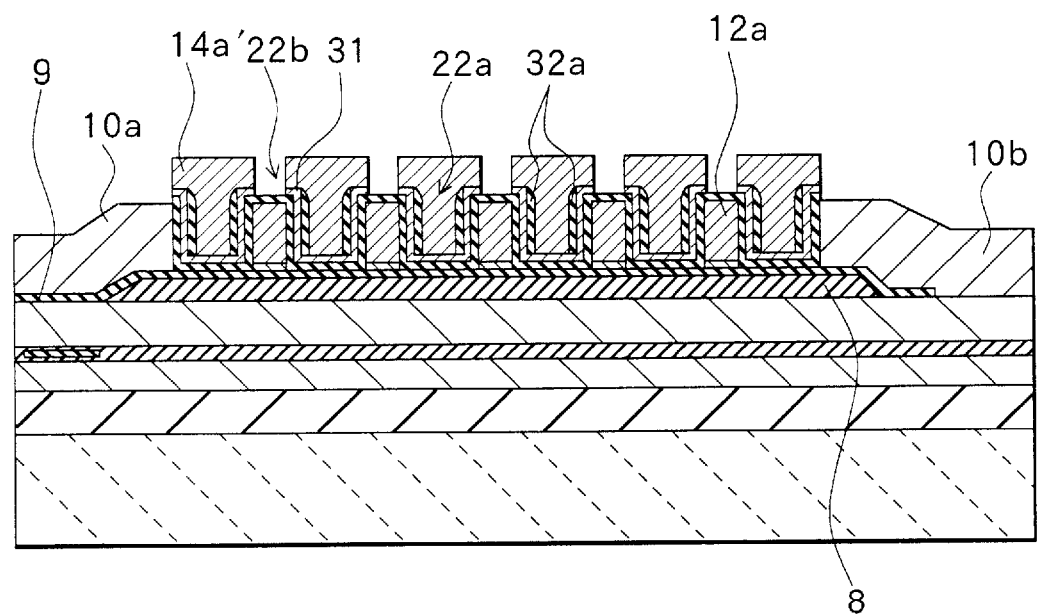
FIG. 49 is a cross sections for illustrating a step that follows FIG. 48.

The insulator sidewalls 32a are formed in the foregoing step shown in FIG. 40A. As shown in FIG. 48, the photoresist layer 33 is then selectively formed on the top pole tips 10a and 10b by photolithography. The helical photoresist pattern 15 is formed as well on the turns of the first coil 12a. The width of the photoresist pattern 15 is narrower than the width of the helical plateau 22b made up of the turn of the first coil 12a, the insulating film 13, the seed layer 31 and the insulator sidewalls 32a. Next, with the photoresist layer 33 and the photoresist pattern 15 as masks, a plating layer 14' is selectively grown from the seed layer 31 at the bottom of the helical groove 22a as a seed. The plating layer 14' is formed such that top face thereof reaches higher than the top face of the helical plateau 22b. Next, as shown in FIG. 49, the photoresist layer 33 and the photoresist pattern 15 are removed. With the plating layer 14' as a mask, the seed layer 31 exposed on the top pole tips 10a and 10b and the helical plateau 22b is removed by ion milling or sputter etching so as to separate the plating layer 14. A second coil 14a' having a T-shaped cross section is thus formed, extending from the inside of the helical groove 22a to the helical plateau 22b. The steps that follow are similar to those described with reference to FIG. 45A. As shown in FIG. 50, the photoresist layer 16 is selectively formed on the thin-film coil made up of the first coil 12a and the second coil 14a. On the coils 12a and 14a', the top pole 17 brought to contact with the top pole tips 10a and 10b and magnetically coupled thereto is selectively formed. The overcoat layer is then further formed to cover the whole surface.

According to this modified example, the second coil 14a' reaches not only inside the groove 22a but also part of top of the helical plateau 22b of the first coil 12a and has a T-shaped cross section. As a result, the cross-sectional area of the second coil 14a' is increased and the electrical resistance of the thin-film coil as a whole is reduced.

Figure 51:
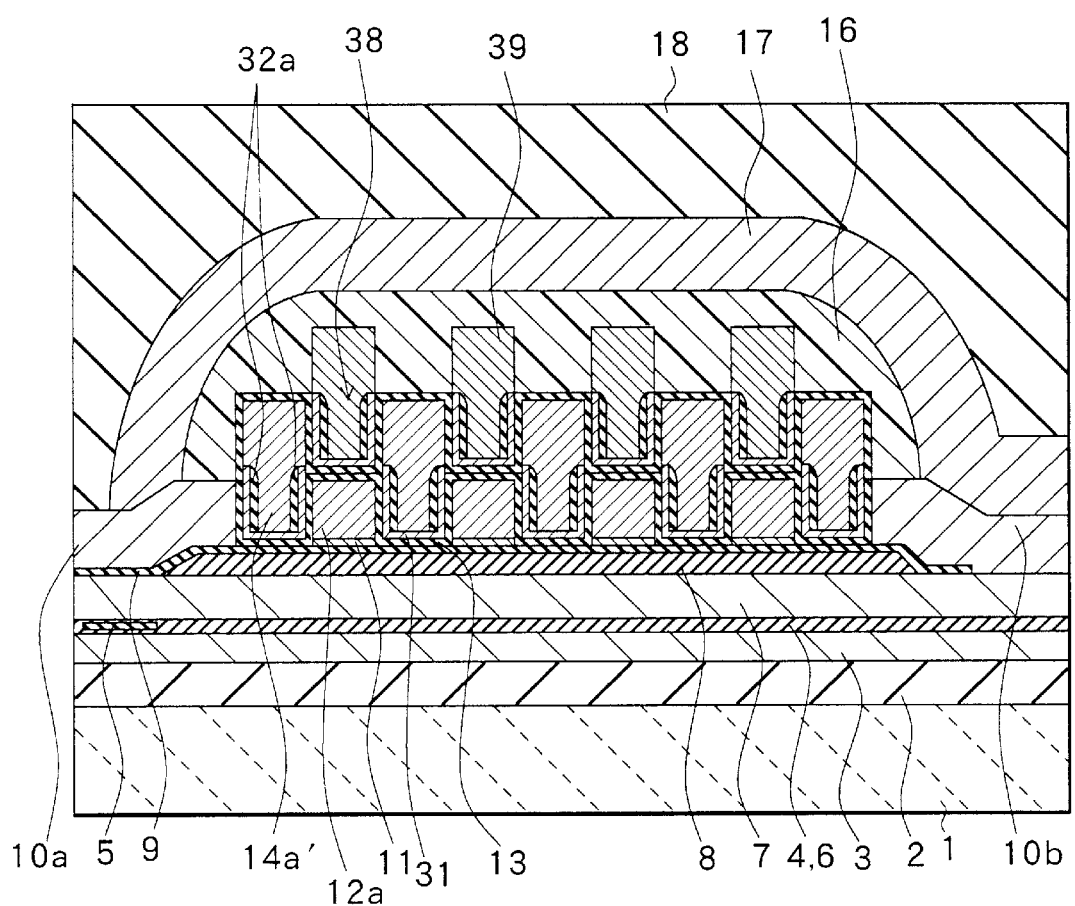
FIG. 51 is a cross section of a thin-film magnetic head of still another modification example of the embodiment of the invention.

In the example shown in FIG. 50, the thin-film coil is made up of the first coil 12a and the T-shaped second coil 14a'. Furthermore, as shown in FIG. 51, a T-shaped third coil 39 may be formed, utilizing a helical groove 38, that is, the space between the turns of the second coil 14a' (the space above the helical plateau 22b made up of the turns of the first coil 12a and so on). The steps of fabricating the third coil 39 are similar to those of the second coil 14a'. The insulating film and seed layer are formed to cover projections and depressions after the formation of the second coil 14a°. Insulator sidewalls are then formed on the inner sides of the helical groove 38. Through plating the seed layer at the bottom of the groove 38 is grown to form the third coil 39. The third coil 39 corresponds to a 'third thin-film coil' of the invention.

Although not shown, a fourth coil may be further formed, utilizing the space between the turns of the third coil 39. In a similar manner, an odd-numbered coil and an even-numbered coil may be alternately formed. As a result, any coil except the first coil 12a may have a T-shaped cross section and the cross-sectional area of the coil is increased and the electrical resistance of the thin-film coil as a whole is reduced. In the modification example shown in FIG. 47A and FIG. 47B, interlayer insulators (the photoresist layer 16 in FIG. 47A) for isolating the layers are required since the thin-film coil of one layer is made up of a pair of an odd coil and an even coil such as the pair of the first and second coils or the pair of the third and fourth coil. In the modification example shown in FIG. 51, in contrast, the coils are insulated by the relatively thin insulating film 13 only and no other interlayer insulator is required. As a result, the height of the thin-film coil as a whole is limited when a plurality of coils are stacked. The apex angle is thereby reduced.

In the modification example shown in FIG. 51, the connection among the first coil 12a, the second coil 14a' and the third coil 39 may be made in a manner similar to the one shown in FIG. 26A and FIG. 26B of the foregoing first embodiment. However, the second coil 14a and the third coil 24 of FIG. 26A and FIG. 26B each represent the second coil 14a' and the third coil 39, respectively, when FIG. 26A and FIG. 26B are adopted to the modification example.

Figure 52:
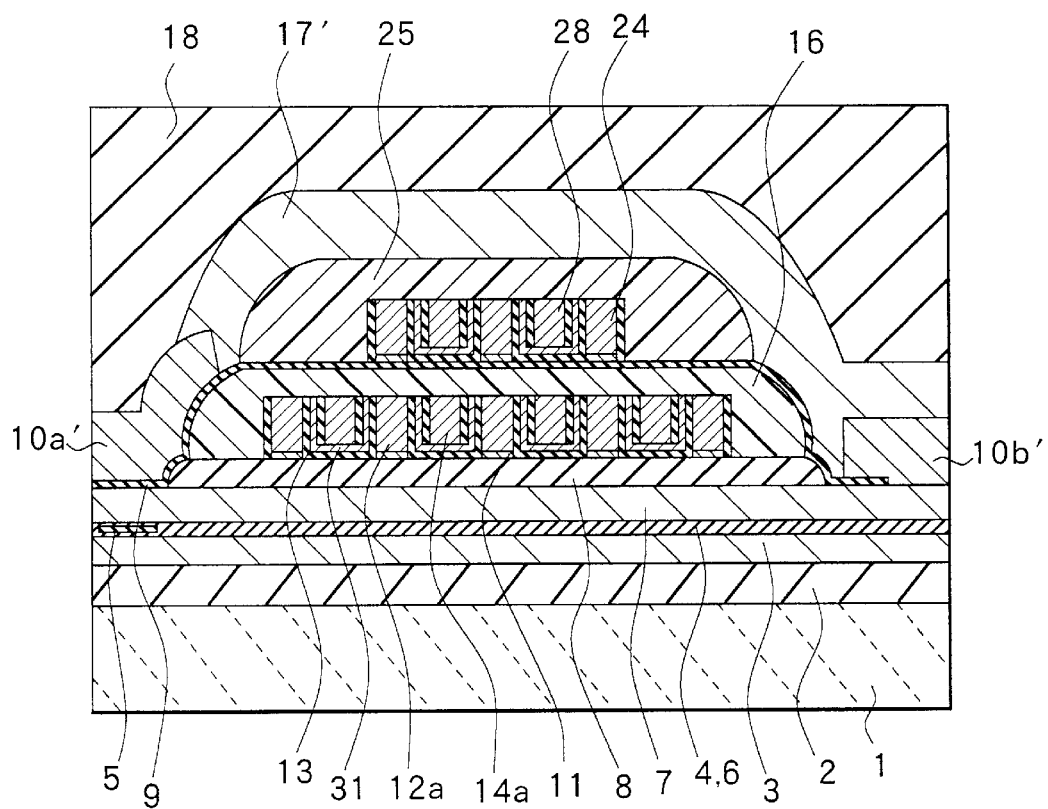
FIG. 52 is a cross section of a thin-film magnetic head of still another modification example of the embodiment of the invention.

In the embodiment and the modification examples of the invention, as shown in FIG. 45A, for example, the top pole tip 10a and the top pole 17 making up the top magnetic layer are coupled to each other whose interface is the plane nearly parallel to the substrate surface. Alternatively, as shown in FIG. 52, for example, not only the top face of the top pole tip 10a' but also the end face thereof is brought to contact with the top pole 17' such that the top pole tip 10a' is held into the top pole 17'. In FIG. 52 like numerals are assigned to the components similar to those shown in FIG. 45A. Such a structure achieves an effect similar to that of the modification example of the foregoing first embodiment shown in FIG. 30.

Figure 53:
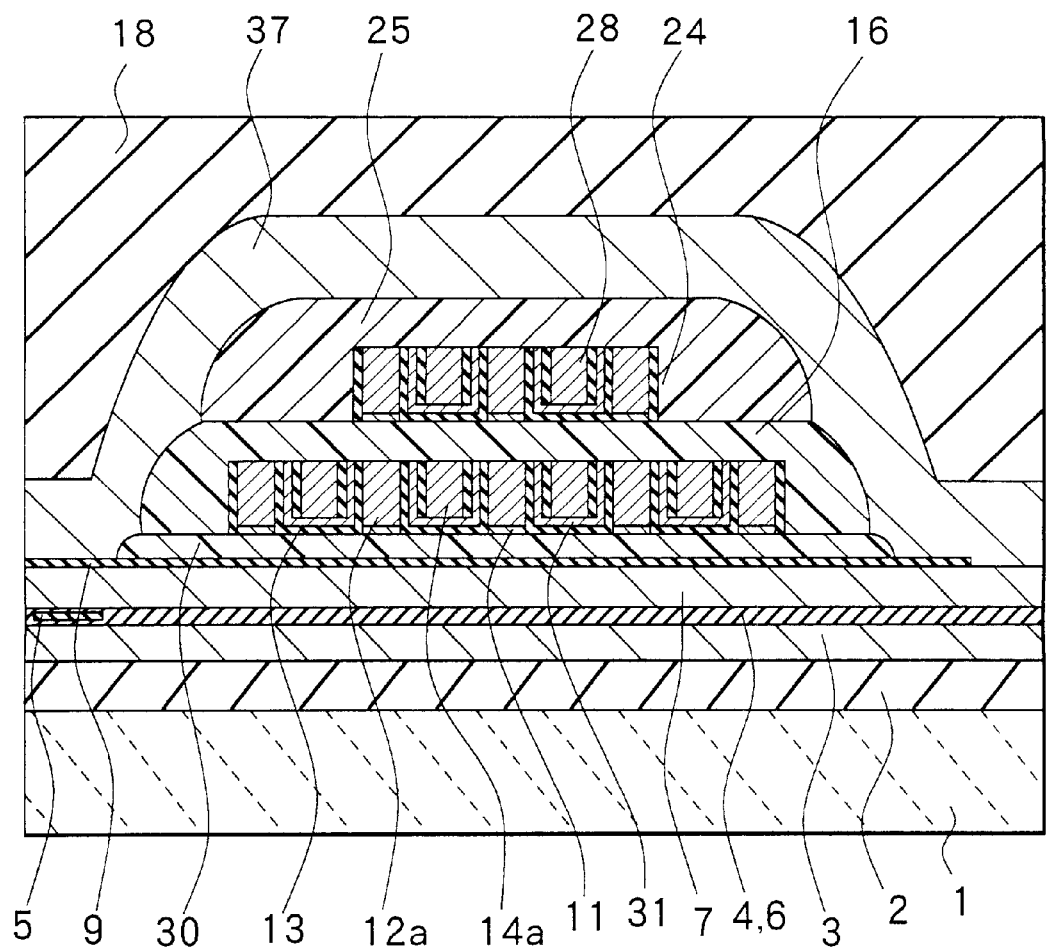
FIG. 53 is a cross section of a thin-film magnetic head of still another modification example of the embodiment of the invention.

In the embodiment and the modification examples of the invention, as shown in FIG. 45A, for example, the top pole, facing the bottom pole 7 with the recording gap layer 9 in between, is divided into the top pole 17 and the top pole tip 10a. The invention is not limited to such a configuration but the top pole may be an integral one as shown in FIG. 53, for example. In FIG. 53 like numerals are assigned to the components similar to those shown in FIG. 45A.

The invention is not limited to the foregoing embodiments but may be practiced in still other ways. For example, the two-layer structure is provided in the modification example shown in FIG. 27, FIG. 28A and FIG. 28B and the modification example shown in FIG. 47A and FIG. 47B, wherein the first coil 12a and the second coil 14a are formed in the one layer and the third coil 24 and the fourth coil 28 in the layer above. Alternatively, more than two layers may be provided. In such a case, it is more efficient and preferred that the number of coils is even. Although the interlayer insulator that isolates first layer and the second layer is the organic photoresist layer 16 in the foregoing modification examples, all the layers may be isolated by an inorganic insulator such as a silicon dioxide film.

In the foregoing embodiments and the modification examples, the substrate surface made up of the substrate 1 and the insulating layer 2 is flattened. Alternatively, a recess may be formed in the substrate 1 or the insulating layer 2 in advance and the layers from the bottom shield layer 3 to the recording gap layer 9 are then formed. In the recess the thin-film coil including the first coil 12a and the second coil 14a is formed. In this case, apex angle θ is further reduced.

In the foregoing embodiments and the modification examples, the bottom pole 7 is formed on the side of the base substrate made up of the substrate 1 and the insulating layer 2, and the top pole tip 10a is formed with the recording gap layer 9 in between. Conversely, a magnetic layer having functions similar to those of the top pole of the foregoing embodiments may be formed on the substrate side. A magnetic layer having functions similar to those of the bottom pole of the foregoing embodiments may be then formed on the recording gap layer 9 placed in between. To be specific, the bottom pole 7 and the top pole tip 10a may be reversed in the trim structure shown in FIG. 20B, for example. To form such a structure, for example, a groove corresponding to magnetic pole width P2W is formed on the substrate side. A bottom pole tip having a shape and a function similar to those of the top pole tip 10a of FIG. 20B is buried in the groove. On the bottom pole tip the recording gap layer 9 is formed on which a top pole having a shape and a function similar to those of the bottom pole 7 of FIG. 20B is formed. That is, magnetic pole width P2W is mainly defined by the bottom pole and part of the top pole and the recording gap layer are formed such that the magnetic pole width is P2W.

Although the method of manufacturing the composite thin-film magnetic head is described in the foregoing embodiments and the modification examples, the invention may be applied to a thin-film magnetic head for recording only or a thin-film magnetic head for recording and reproducing, having an induction magnetic transducer for writing. The invention may be applied to a thin-film magnetic head wherein an element for writing and an element for reading are stacked in a reverse order.

According to the thin-film magnetic head and the method of manufacturing the same of the invention described so far, the second thin-film coil is embedded at least inside the helical groove covered with the insulating film covering at least the bottom and sides of the helical groove which is the region between the turns of the first thin-film coil such that the second thin-film coil directly comes to contact with the insulating film. Consequently, the first and second thin-film coils belong to one layer with the insulating film in between. The pitch of the turns of the thin-film coil unit of the single layer is thereby reduced without particularly improving processing accuracy of the step of fabricating the first thin-film coil. As a result, the number of turns may be increased without increasing the layers of the thin-film coil unit nor without increasing the coil bundle width of the thin-film coil unit. In other words, the coil bundle width may be reduced as long as the number of layers and the number of turns of the thin-film coil unit are constant. Consequently, the magnetic path length, that is, the length of the magnetic circuit made up of the two magnetic layers may be reduced. As a result, the invention achieves improvements in characteristics of the thin-film magnetic head. A reduction in size of the thin-film magnetic head itself is achieved as well.

According to the other thin-film magnetic head or the method of manufacturing the same of the invention, the insulating film reaches the top of the first thin-film coil. The second thin-film coil covers part of the top of the first thin-film coil with the insulating film in between. As a result, the cross-sectional area of the second thin-film coil is increased and the electrical resistance of the thin-film coil unit is reduced.

According to still the other thin-film magnetic head or the method of manufacturing the same of the invention, the thin-film coil unit further includes a third thin-film coil formed in a layer other than the first and second thin-film coils with an interlayer insulator in between. The third thin-film coil connects an internal end of the first thin-film coil to an external end of the second thin-film coil or an external end of the first thin-film coil to an internal end of the second thin-film coil. As a result, the first thin-film coil, the third thin-film coil, and the second thin-film coil are connected in series in this order. The directions of turning of the coils are made equal. Therefore, the total number of turns of the thin-film coil unit may be further increased.

According to still the other thin-film magnetic head or the method of manufacturing the same of the invention, the insulating film and the conductive film are stacked to cover at least the bottom and sides of the helical groove which is the region between the turns of the first thin-film coil. The conductive film on the sides of the helical groove is covered with the insulator sidewalls. As a result, unfavorable effects that may result from the conductive film on the sides of the helical groove are suppressed.

According to still the other thin-film magnetic head or the method of manufacturing the same of the invention, the insulator sidewalls suppress the function of the conductive film on the sides of the helical groove as a seed layer. The second thin-film coil is formed through plating growth only from the conductive film exposed at the bottom of the helical groove as a seed layer. As a result, plating growth from the conductive film on the sides of the helical groove is inhibited. Generation of voids is thereby suppressed when the second thin-film coil is formed through plating growth.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic heads including:
   at least two magnetic layers including two magnetic poles magnetically coupled to each other, part of sides of the magnetic poles facing a recording medium being opposed to each other with a gap layer in between; and
   a thin-film coil unit placed between the at least two magnetic layers, the thin-film coil unit including:
   a helical-shaped first thin-film coil;
   an insulating film covering at least a bottom and sides of a helical groove which is a region between turns of the first thin-film coil, the insulating film extending to a top surface of the first thin-film coil; and
   a second thin-film coil, having a T-shaped cross-section, being at least partially positioned inside the helical groove covered with the insulating film so as to directly come to contact with the insulating film, and further being at least partially positioned so that a portion of the second thin-film coil covers at least part of the top surface of the first thin-film coil with the insulating film, in between.

2. A thin-film magnetic head according to claim 1 wherein the thin-film coil unit further includes:
   a third thin-film coil formed in a layer other than the first and second thin-film coils with an interlayer insulator in between and connecting an internal end of the first thin-film coil to an external end of the second thin-film coil or an external end of the first thin-film coil to an internal end of the second thin-film coil.

3. A thin-film magnetic head according to claim 1 wherein the first thin-film coil includes:
   a thin base conductive film and
   a conductive plating layer selectively formed from the base conductive film as a seed layer.

4. A thin-film magnetic head according to claim 1 wherein the second thin-film coil includes:
   a thin base conductive film and
   a conductive plating layer selectively formed from the base conductive film as a seed layer.

5. A thin-film magnetic head according to claim 1 wherein the second thin-film coil includes a vapor phase growth conductive layer formed through vapor phase growth.

6. A thin-film magnetic head according to claim 5 wherein the vapor phase growth is chemical vapor deposition.

7. A thin-film magnetic head according to claim 1 wherein the insulating film is an inorganic insulating film.

8. A thin-film magnetic head according to claim 7 wherein the inorganic insulating film is made of aluminum oxide.

9. A thin-film magnetic head according to claim 1 wherein the insulating film has such a thickness that a groove shape corresponding to the helical groove remains when the insulating film covers at least the bottom and the sides of the helical groove which is the region between the turns of the first thin-film coil.

10. A thin-film magnetic head according to claim 1 wherein a plurality of the thin-film coil units are formed in layers with an interlayer insulator in between.

11. A thin-film magnetic head according to claim 1, further including a magnetoresistive element for reading.

12. A thin-film magnetic heads including:
   at least two magnetic layers including two magnetic poles magnetically coupled to each other, part of sides of the magnetic poles facing a recording medium being opposed to each other with a gap layer in between; and
   a thin-film coil unit placed between the at least two magnetic layers, the thin-film coil unit including:
   a helical-shaped first thin-film coil;
   an insulating film covering at least a bottom and sides of a helical groove which is a region between turns of the first thin-film coil;
   a conductive film covering the bottom and the sides of the helical groove covered with the insulating film;
   insulator sidewall films covering only the conductive film on the sides of the helical groove; and
   a second thin-film coil embedded at least inside the helical groove covered with the conductive film and the insulator sidewall films.

13. A thin-film magnetic head according to claim 12 wherein the conductive film functions as a base conductive film used when the second thin-film coil is formed.

14. A thin-film magnetic head according to claim 13 wherein the insulator sidewalls have a function of inhibiting growth of the second thin-film coil from the conductive layer on the sides of the helical groove as a seed layer.

15. A thin-film magnetic head according to claim 12 wherein the second thin-film coil is formed through plating growth from the conductive layer exposed at the bottom of the helical groove as a seed layer.

16. A thin-film magnetic head according to claim 12 wherein the insulating film reaches the top of the first thin-film coil.

17. A thin-film magnetic head according to claim 16 wherein the second thin-film coil covers part of the top of the first thin-film coil with the insulating film in between.

18. A thin-film magnetic head according to claim 12 wherein the thin-film coil unit further includes:
a third thin-film coil formed in a layer other than the first and second thin-film coils with an interlayer insulator in between and connecting an internal end of the first thin-film coil to an external end of the second thin-film coil or an external end of the first thin-film coil to an internal end of the second thin-film coil.

19. A thin-film magnetic head according to claim 12 wherein the first thin-film coil includes:
a thin base conductive film and
a conductive plating layer selectively formed from the base conductive film as a seed layer.

20. A thin-film magnetic head according to claim 12 wherein the insulating film is an inorganic insulating film.

21. A thin-film magnetic head according to claim 20 wherein the inorganic insulating film is made of aluminum oxide.

22. A thin-film magnetic head according to claim 12 wherein the insulator sidewalls are made of inorganic insulating films.

23. A thin-film magnetic head according to claim 22 wherein the inorganic insulating films are made of aluminum oxide.

24. A thin-film magnetic head according to claim 12 wherein the insulating film has such a thickness that a groove shape corresponding to the helical groove remains when the insulating film covers at least the bottom and the sides of the helical groove which is the region between the turns of the first thin-film coil.

25. A thin-film magnetic head according to claim 12 wherein a plurality of the thin-film coil units are formed in layers with an interlayer insulator in between.

26. A thin-film magnetic head according to claim 12, further including a magnetoresistive element for reading.

27. A thin film magnetic head, including:
two magnetic layers including two magnetic poles magnetically coupled to each other, part of sides of the magnetic poles facing a recording medium being opposed to each other with a gap layer in between; and
a thin-film coil unit placed between the two magnetic layers;
the thin-film coil unit including:
a helical-shaped first thin-film coil;
an insulating film covering at least a bottom and sides of a helical groove which is a region between turns of the first in-film coil, the insulating film having one or more top edges; and
a second thin-film coil embedded at least inside the helical groove covered with the insulating film so as to directly be in contact with the insulating film wherein:
top edges of the first thin-film coil and the second thin-film coil are on a same level surface; and
the one or more top edges of the insulating film are on the same level surface on which the top edges of the first thin-film coil and the second thin-film coil are located.

28. A method of manufacturing a thin-film magnetic head, including:
at least two magnetic layers including two magnetic poles magnetically coupled to each other, part of sides of the magnetic poles facing a recording medium being opposed to each other with a gap layer in between; and
a thin-film coil unit placed between the at least two magnetic layers, steps of forming the thin-film coil unit including the steps of:
forming a helical-sped first thin-film coil;
forming an insulating film covering at least a bottom and sides of a helical groove which is a region between turns of the first thin-film coil, the insulating film extending to a top surface of the first thin-coil; and
forming a second thin-film coil, having a T-shaped cross-section, being at least partially positioned inside the helical groove covered with the insulating film so as to directly come to contact with the insulating film, and further being at least partially positioned so that a portion of the second thin-film coil covers at least part of the top surface of the first thin-film coil with the insulating film in between.

29. A method of manufacturing a thin-film magnetic head according to claim 28, further including the steps of:
forming a third thin-film coil in a layer other than the first and second thin-film coils with an interlayer insulator in between, the third thin-film coil connecting an internal end of the first thin-film coil to an external end of the second thin-film coil or an external end of the first thin-film coil to an internal end of the second thin-film coil.

30. A method of manufacturing a thin-film magnetic head according to claim 28 wherein the step of forming the first thin-film coil includes the steps of:
forming a thin base conductive film and
effecting selective plating growth from the base conductive film as a seed layer.

31. A method of manufacturing a thin-film magnetic head according to claim 28 wherein the step of forming the second thin-film coil includes the step of:
forming a thin base conductive film and
effecting selective plating growth from the base conductive film as a seed layer.

32. A method of manufacturing a thin-film magnetic head according to claim 28 wherein the step of forming the second thin-film coil includes the step of effecting selective vapor phase growth.

33. A method of manufacturing a thin-film magnetic head according to claim 32 wherein the step of effecting selective vapor phase growth is achieved through chemical vapor deposition.

34. A method of manufacturing a thin-film magnetic head according to claim 28 wherein the insulating film is an inorganic insulating film.

35. A method of manufacturing a thin-film magnetic head according to claim 34 wherein the inorganic insulating film is made of aluminum oxide.

36. A method of manufacturing a thin-film magnetic head according to claim 28 wherein the insulating film has such a thickness that a groove shape corresponding to the helical groove remains when the insulating film covers at least the bottom and the sides of the helical groove which is the region between the turns of the first thin-film coil.

37. A method of manufacturing a thin-film magnetic head according to claim 28 wherein a plurality of the thin-film coil units are formed in layers with an interlayer insulator in between.

38. A method of manufacturing a thin-film magnetic head according to claim 28, further including the step of forming a magnetoresistive element for reading.

39. A method of manufacturing a thin-film magnetic head, including:

at least two magnetic layers including two magnetic poles magnetically coupled to each other, part of sides of the magnetic poles facing a recording medium being opposed to each other with a gap layer in between; and a thin-film coil unit placed between the at least two magnetic layers, steps of forming the thin-film coil unit including the steps of:

forming a helical-shaped first thin-film coil;

forming an insulating film covering at least a bottom and sides of a helical groove which is a region between turns of the first thin-film coil;

forming a conductive film covering the bottom and the sides of the helical groove covered with the insulating film;

forming insulator sidewall films covering only the conductive film on the sides of the helical groove; and forming a second thin-film coil embedded at least inside the helical groove covered with the conductive film and the insulator sidewall films.

40. A method of manufacturing a thin-film magnetic head according to claim 39 wherein the conductive film is used as a base conductive film used when the second thin-film coil is formed.

41. A method of manufacturing a thin-film magnetic head according to claim 40 wherein the insulator sidewalls are used for inhibiting growth of the second thin-film coil from the conductive layer on the sides of the helical groove as a seed layer.

42. A method of manufacturing a thin-film magnetic head according to claim 39 wherein the step of forming the second thin-film coil includes the step of effecting plating growth from the conductive layer exposed at the bottom of the helical groove as a seed layer.

43. A method of manufacturing a thin-film magnetic head according to claim 39 wherein the insulating film reaches the top of the first thin-film coil.

44. A method of manufacturing a thin-film magnetic head according to claim 43 wherein the second thin-film coil covers part of the top of the first thin-film coil with the insulating film in between.

45. A method of manufacturing a thin-film magnetic head according to claim 39, further including the steps of:

forming a third thin-film coil in a layer other than the first and second thin-film coils with an interlayer insulator in between, the third thin-film coil connecting an internal end of the first thin-film coil to an external end of the second thin-film coil or an external end of the first thin-film coil to an internal end of the second thin-film coil.

46. A method of manufacturing a thin-film magnetic head according to claim 39 wherein the step of forming the first thin-film coil includes the steps of:

forming a thin base conductive film and effecting selective plating growth from the base conductive film as a seed layer.

47. A method of manufacturing a thin-film magnetic head according to claim 39 wherein the insulating film is an inorganic insulating film.

48. A method of manufacturing a thin-film magnetic head according to claim 47 wherein the inorganic insulating film is made of aluminum oxide.

49. A method of manufacturing a thin-film magnetic head according to claim 39 wherein the insulator sidewalls are made of inorganic insulating films.

50. A method of manufacturing a thin-film magnetic head according to claim 49 wherein the inorganic insulating films are made of aluminum oxide.

51. A method of manufacturing a thin-film magnetic head according to claim 39 wherein the insulating film has such a thickness that a groove shape corresponding to the helical groove remains when the insulating film covers at least the bottom and the sides of the helical groove which is the region between the turns of the first thin-film coil.

52. A method of manufacturing a thin-film magnetic head according to claim 39 wherein a plurality of the thin-film coil units are formed in layers with an interlayer insulator in between.

53. A method of manufacturing a thin-film magnetic head according to claim 39, further including the step of forming a magnetoresistive element for reading.

* * * * *